US009645847B1

(12) United States Patent
Roth

(10) Patent No.: US 9,645,847 B1
(45) Date of Patent: May 9, 2017

(54) EFFICIENT SUSPEND AND RESUME OF INSTANCES

(71) Applicant: Amazon Technologies, Inc., Seattle, WA (US)

(72) Inventor: Gregory Branchek Roth, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 14/733,834

(22) Filed: Jun. 8, 2015

(51) Int. Cl.
*G06F 9/455* (2006.01)
*G06F 9/48* (2006.01)
*G06F 9/50* (2006.01)

(52) U.S. Cl.
CPC ........ *G06F 9/4868* (2013.01); *G06F 9/45533* (2013.01); *G06F 9/45558* (2013.01); *G06F 9/505* (2013.01); *G06F 2009/45562* (2013.01); *G06F 2009/45575* (2013.01)

(58) Field of Classification Search
CPC .............................. G06F 9/52; G06F 9/45533
USPC ..................................................... 718/1, 104
See application file for complete search history.

(56) References Cited

U.S. PATENT DOCUMENTS

| | | | |
|---|---|---|---|
| 7,213,246 B1 | 5/2007 | van Rietsc et al. | |
| 7,246,200 B1* | 7/2007 | van Rietschote | ..... G06F 9/4403 709/220 |
| 7,454,448 B1 | 11/2008 | Daynes et al. | |
| 8,135,930 B1* | 3/2012 | Mattox | ............... G06F 9/45558 711/100 |
| 8,296,759 B1* | 10/2012 | Hutchins | ............. G06F 9/45558 709/223 |
| 8,347,288 B1* | 1/2013 | Brandwine | ......... G06F 11/3692 718/1 |
| 8,352,608 B1* | 1/2013 | Keagy | ....................... G06F 8/63 709/220 |
| 8,572,613 B1* | 10/2013 | Brandwine | ......... G06F 9/45533 714/38.1 |
| 8,635,351 B2* | 1/2014 | Astete | .......................... 709/215 |

(Continued)

OTHER PUBLICATIONS

"Using Snapshots to Manage Virtual Machines," ESXi and vCenter Server 5.5 Documentation, <http://pubs.vmware.com/vsphere-55/topic/com.vmware.vsphere.vm_admin.doc/GUID-CA948C69-7F58-4519-AEB1-739545EA94E5.html> [retrieved May 22, 2015], 2 pages.

(Continued)

*Primary Examiner* — Phillip H Nguyen
(74) *Attorney, Agent, or Firm* — Davis Wright Tremaine LLP

(57) ABSTRACT

A virtual machine is suspended as a result of receiving a request for suspending a plurality of virtual machines, and, for each virtual machine of the plurality, obtaining a first snapshot of an exemplary virtual machine, obtaining a second snapshot of the virtual machine, determining a set of changes based on the second snapshot and the first snapshot, storing the set of changes in persistent storage in association with the virtual machine, and terminating the virtual machine. The system and method further including receiving a request for restoring the plurality of virtual machines to corresponding previous states, and, for each virtual machine of the plurality, obtaining the first snapshot of the exemplary virtual machine, obtaining the second snapshot of the virtual machine, and restoring the virtual machine to a previous state based on the second snapshot.

23 Claims, 10 Drawing Sheets

(56) References Cited

U.S. PATENT DOCUMENTS

| | | | |
|---|---|---|---|
| 8,683,495 B1* | 3/2014 | Moore | G06F 9/485 |
| | | | 718/1 |
| 8,856,782 B2* | 10/2014 | Ghosh | G06F 9/45533 |
| | | | 718/1 |
| 9,104,331 B2 | 8/2015 | Hsu et al. | |
| 2007/0300220 A1* | 12/2007 | Seliger | G06F 8/61 |
| | | | 718/1 |
| 2007/0300221 A1 | 12/2007 | Hartz et al. | |
| 2009/0007100 A1* | 1/2009 | Field | G06F 21/53 |
| | | | 718/1 |
| 2009/0260007 A1* | 10/2009 | Beaty | G06F 9/5077 |
| | | | 718/1 |
| 2009/0313447 A1* | 12/2009 | Nguyen | G06F 11/1451 |
| | | | 711/162 |
| 2010/0049929 A1* | 2/2010 | Nagarkar | G06F 9/45533 |
| | | | 711/162 |
| 2010/0070725 A1 | 3/2010 | Prahlad et al. | |
| 2010/0088699 A1 | 4/2010 | Sasaki | |
| 2011/0010515 A1 | 1/2011 | Ranade | |
| 2011/0066879 A1 | 3/2011 | Nakai | |
| 2011/0099267 A1* | 4/2011 | Suri | G06F 9/4856 |
| | | | 709/224 |
| 2011/0148895 A1 | 6/2011 | Burckart et al. | |
| 2012/0246645 A1 | 9/2012 | Iikura et al. | |
| 2013/0212709 A1* | 8/2013 | Tucker | G06F 21/55 |
| | | | 726/29 |
| 2013/0227567 A1 | 8/2013 | Horikawa | |
| 2013/0247036 A1 | 9/2013 | Fujiwara | |
| 2014/0173213 A1 | 6/2014 | Beveridge | |
| 2016/0124665 A1* | 5/2016 | Jain | G06F 3/0619 |
| | | | 711/162 |

OTHER PUBLICATIONS

"Using the Snapshot," © 2015 VMware, Inc., <https://www.vmware.com/support/ws4/doc/preserve_snapshot_ws.html> [retrieved May 22, 2015], 4 pages.

* cited by examiner

EFFICIENT SUSPEND AND RESUME OF INSTANCES

CROSS REFERENCE TO RELATED APPLICATION

This application incorporates by reference for all purposes the full disclosure of co-pending U.S. patent application Ser. No. 14/733,748, filed concurrently herewith, entitled "FORENSIC INSTANCE SNAPSHOTTING".

BACKGROUND

Computing resource providers often host computing resources, such as servers, data storage devices, and networking devices as a service to their customers. Customers can operate some of their computing infrastructure using hardware of the computing resource providers, thereby reducing the amount of upfront investment needed for the infrastructure and often resulting in an overall lower cost to the customer. Customers are often able to configure and reconfigure their infrastructure remotely and programmatically in order to best suit their needs.

In many cases, customers transmit requests to create instances, such as virtual computing instances to execute on physical computing systems in the computing resource service provider computing environment. In many of these computing environments, it is good practice to periodically reboot computing systems and/or restore them to an initial, known-good state. Otherwise, the longer a computing system has been running, the more likely the computer system will end up in a state that has not been sufficiently tested, if at all, will have been changed to a nonstandard configuration, or will be compromised by an installation of unauthorized executable code. For virtual computing instances, frequent restarts and re-instantiations from known-good software images can help prevent malicious attackers from compromising the virtual computing instances. However, restarting and re-initializing computing systems and virtual computing instances has the unfortunate side effect of eliminating evidence of attacks and sources of other issues that may have arisen with the system state.

BRIEF DESCRIPTION OF THE DRAWINGS

Various embodiments in accordance with the present disclosure will be described with reference to the drawings, in which.

DETAILED DESCRIPTION

Figure 1:
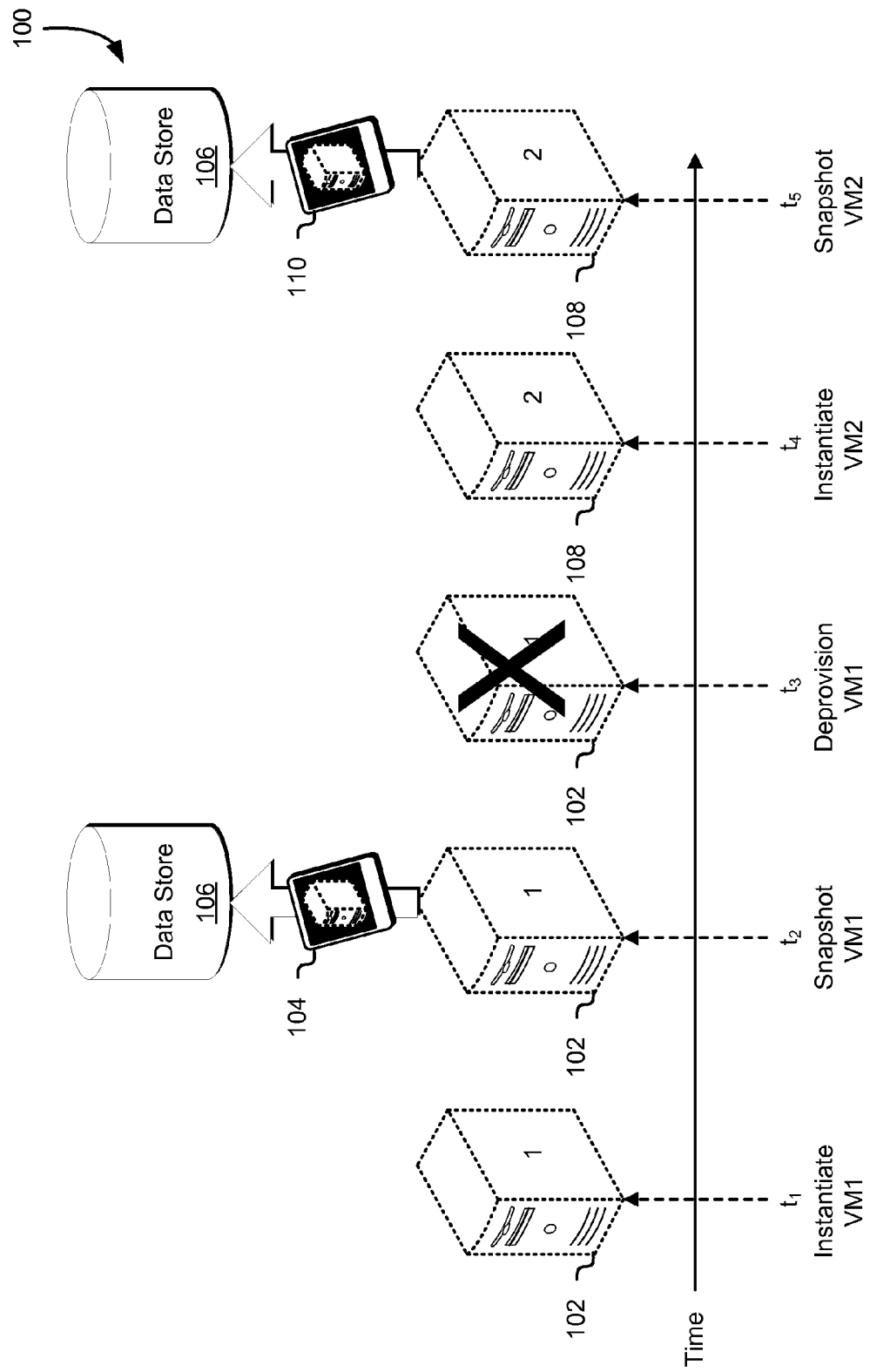
FIG. 1 illustrates an example of capturing a base snapshot and an initial snapshot in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include a system and method for preserving the system state of a physical or virtual computing system in a manner such that the system state can be re-created at a later date for forensic investigation upon detection of an event external to the computing system that causes the computing system to terminate or shut down. The techniques described include configuring an event trigger for causing, upon occurrence of an associated event, a set of local changes to the computing system of a set of computing systems in a distributed computing environment to be captured. For instance, the triggering event could be an instruction to terminate the computing system. In some examples, the instruction could come from a scaling service configured to instantiate or terminate virtual machines according to a set of rules (e.g., instantiate additional virtual machines during periods of high demand, terminate excess virtual machines during periods of low demand, terminate and re-instantiate virtual machines when abounded lifespan exceeds a threshold, etc.). In other examples, the instruction could come from a customer, application, or other authorized entity, such as through an application programming interface.

The set of local changes may be differences between the current state of the virtual machine and a previous state of the virtual machine. The set of local changes may be determined by comparing the current state with the previous state and identifying the differences. The set of local changes may be stored in persistent storage for analysis later. The distributed computing environment may include computing resources provided to one or more customers of a computing resource service provider. The computing resources may be provided by services such as, virtual computer system services, on-demand storage services, database services, block level storage services, authentication services, cryptography services, policy management services, archival storage services, and other computing services.

The virtual machines of the set of virtual machines may be configured to have various resources, such as virtual memory, one or more virtual processors, one or more virtual or physical storage volumes (which may be comprised of a plurality of partitions distributed among one or more storage devices), network interfaces, graphical interfaces, and input/output interfaces. The techniques of the present disclosure include instantiating one or more virtual machines from a base software image (e.g., a file containing the contents and structure of a storage volume) such that the one or more virtual machines are as identically configured as is practicable and may be executing in parallel. The one or more virtual machines may continue to run and perform the tasks for which they were configured to perform until the occurrence of a predetermined event. This predetermined event may be that the virtual machine has reached the end of its predetermined bounded lifetime. Other examples of predetermined events may be the receipt of a request through an application programming interface from a customer (i.e., a device operated by or on behalf of the customer), the computing resource service provider, or other authorized entity to terminate the virtual machine or to capture the set of local changes. Still other examples may be upon detection of an intrusion/security compromise of the virtual machine, detection of the software or hardware error of the virtual machine, the occurrence of an interval period (e.g., every 15 minutes, etc.), or the receipt of a request to suspend the virtual machine.

An initial snapshot of the virtual machine may be captured when the virtual machine is in an initial state. For example, once the virtual machine has been instantiated with the base software image, it may be allowed to boot and reach a stage where the software configured to execute on startup is fully loaded, or a stage where a read is detected at a predetermined memory address or at a predetermined local storage, or where the system is detected to be in an idle state, whereupon the initial snapshot may be captured. Note that the virtual machine may be isolated from certain input/output, such as communication from a network to which the virtual machine is intended to be connected; this minimizes the potential influence on the state of the virtual machine from outside entities. Note that isolating the virtual machine, in some cases, may be effectively accomplished by not including the virtual machine in a set of virtual machines being tasked by work from a load balancer. Note also that the initial snapshot may include a snapshot of a state of the virtual memory of the virtual machine and/or a state of storage attached to the virtual machine at this initial time.

In some examples, the set of differences between the initial snapshot and a snapshot of an exemplary virtual machine of the set of virtual machines (also referred to as a base snapshot or a baseline snapshot) may be computed. That is, the initial snapshot may be compared with a baseline snapshot to determine what is different in the initial snapshot from the baseline snapshot, and the set of differences may be stored in persistent storage for later use in reconstructing the initial snapshot. For example, the initial snapshot may be reconstructed by combining the baseline snapshot with the set of differences. However, in some examples, the entire initial snapshot may be stored instead of or in addition to the set of differences.

Once the initial snapshot has been captured, the virtual machine may be allowed to run and perform its tasks until the occurrence of the predetermined event (i.e., thereby triggering the event trigger), whereupon a second snapshot may be obtained. As noted, in some cases the occurrence of the predetermined event may be an instruction to terminate the virtual machine. The virtual machine may be allowed to complete whatever tasks it is currently working on but the virtual machine may be prevented from accepting any new tasks; in some cases, this may be accomplished by removing the virtual machine from a set of virtual machines managed by a load balancer. Additionally or alternatively, the virtual machine may be isolated from the networks to which it is attached once it is finished completing the tasks it is currently working on. Like the initial snapshot, the current snapshot may be a snapshot of the state of the memory of the virtual machine and/or the state of the storage attached to the virtual machine at the current time.

A set of local changes (i.e., differences) may be determined between the current snapshot and the initial snapshot and these local changes may be stored in persistent storage the virtual machine. The virtual machine may then be terminated and de-provisioned. This process may be performed for each virtual machine of the set of virtual machines. At a later date, if it is determined to rehabilitate the virtual machine to the state it was in at the time it was terminated, this process may be performed by obtaining the initial snapshot (which may be obtained by combining a baseline snapshot with the set of differences between the baseline snapshot and the initial snapshot described above), and combining the initial snapshot with the set of local changes.

Techniques of the present disclosure may also be used for suspension of virtual machines and for efficiently resuming their operation from suspension. That is, upon receiving an instruction to suspend a set of virtual machines, such as a large fleet of virtual machines, each of the set of virtual machines may be suspended in the manner described above. That is, the set of local changes to each virtual machine may be stored in persistent storage and each virtual machine may then be terminated and provisioned. Upon receipt of an instruction to resume the set of virtual machines to the state they were in at the time of receiving the suspend instruction, the initial snapshot of each of the virtual machines may be obtained in the manner described above and combined with their respective set of local changes to re-create the snapshot of the virtual machine that was captured at the time of the suspension. The respective virtual machine may then be re-instantiated based on the re-created snapshot.

Described and suggested techniques improve the field of computing, specifically the field of digital forensics, by capturing before and after snapshots of a computing system which can be preserved for forensic investigation at a later date. Additionally, described and suggested techniques improve the efficiency of virtual computing environments by allowing fleets of computers to quickly resume from a suspend command. Moreover, described and suggested techniques are necessarily rooted in computer technology in order to overcome a problem specifically arising with the computing resources required to store snapshots of a computing device for later digital forensic analysis by only persisting changes to the state of the computing device from an initial state.

FIG. 1 illustrates an aspect 100 of an embodiment of the present disclosure. FIG. 1 depicts creation of a base snapshot 104 of an exemplary virtual machine 102 which is then terminated, and then creation of at least one additional virtual machine 108 and capturing its initial snapshot 110. The actions depicted in FIG. 1 may be performed as an initial matter for obtaining a snapshot of an initial state of the at least one virtual machine 108.

The exemplary virtual machine 102 may be a virtual machine instantiated from a base image configured for the at least one virtual machine 108. That is, the at least one virtual machine 108 may actually be a fleet of virtual machines all instantiated from the same base image. The base image, therefore may be configured with the appropriate operating system, software, and various configuration settings sufficient to perform the tasks which the at least one virtual machine 108 is intended to perform. In this manner, the members of the fleet of virtual machines may all have common configurations. Time $T_1$ represents the time at which the exemplary virtual machine 102 is instantiated.

At time $T_2$, the base snapshot 104 of the exemplary virtual machine 102 is captured and stored in the data store 106. The base snapshot 104 may be a bit-by-bit copy of the state of the memory of the exemplary virtual machine 102 as well as the state of one or more storage volumes attached to the exemplary virtual machine 102. The state of the memory included in the snapshot may include the contents in physical memory of the host computing system of the exemplary virtual machine 102 to which the virtual memory of the exemplary virtual machine 102 is mapped. In some implementations, the base snapshot 104 does not include contents of attached storage volumes. The data store 106 may be any type of storage medium sufficient for storing snapshots of computing systems, including virtual machines. Examples of such storage mediums include databases, block level storage devices, on-demand storage, archival storage, tape backup, and other storage systems.

Once the baseline snapshot has been captured, at time $T_3$ the exemplary virtual machine 102 may be terminated and de-provisioned, although in some cases the exemplary virtual machine 102 may then be made a member of the at least one virtual machine 108 and treated the same as the at least one virtual machine 108. As noted, the at least one virtual machine 108 may be one or more virtual machines of a fleet of virtual machines configured to perform tasks for a customer of a computing resource service provider. The fleet of virtual machines may be managed by a scaling service, which may be configured to launch virtual machine instances on physical host computing systems. The scaling service may be configured to launch additional virtual machines during periods of high demand by the customer or users of the customer's virtual machines and/or may be configured to terminate virtual machines during periods of low demand. Scaling service may additionally or alternatively be configured to launch each of the virtual machines with a bounded lifespan; e.g., each virtual machine may be configured to expire and terminate after a certain time period, and a replacement virtual machine may be re-instantiated from the same base image if needed. The virtual machines on each host physical computing machine may be managed through a virtualization layer, such as via a hypervisor.

In some implementations, a configuration for one or more virtual machines may be a set of rules or settings stored in a file, database table, or other structure that specify events and actions to perform upon the occurrence of such specified events. For example, a configuration may specify that, upon detection of a termination command (e.g., SIGKILL from a hypervisor) directed to one or more virtual machines, snapshots and/or sets of local changes should be stored for each of the virtual machines prior to termination. In some implementations, the configuration may be configurable by a customer of a computing resource service provider through an application programming interface, such as through a web interface.

At time $T_4$, the at least one virtual machine 108 may be instantiated from the base image in a similar manner as was the exemplary virtual machine 102. As noted, in some embodiments, the at least one virtual machine 108 may be a member of a fleet of virtual machines all having a common configuration. However each member of the fleet may be running independently and/or in parallel with other members of the fleet and may be performing different tasks than other members of the fleet, and, consequently, at any particular point in time, the at least one virtual machine 108 may be in a different state from other members of the fleet.

Then at time $T_5$, when the at least one virtual machine 108 has reached a stage in its startup similar to the stage of the exemplary virtual machine 102 at time $T_2$, the initial snapshot 110 of the at least one virtual machine 108 may be captured. Note that, as the at least one virtual machine 108 may be a plurality of virtual machines, initial snapshots of each of the plurality of virtual machines may be captured, asynchronously or synchronously. Similar to the description of the base snapshot 104, the initial snapshot 110 may be a snapshot of the memory and/or storage of the at least one virtual machine 108. In some embodiments, the initial snapshot 110 are stored in the data store 106. In other embodiments, a set of differences are determined between the initial snapshot 110 and the base snapshot 104, and the set of differences may be stored in the data store 106 instead of the initial snapshot 110, as the initial snapshot 110 may be reconstructed by taking the base snapshot 104 and applying the set of differences.

The techniques of the present disclosure may be implemented in an environment that is configured to perform the operations of launching virtual machines, executing the virtual machines for a period of time, terminating the virtual machines, and creating new virtual machines to replace the terminated virtual machines based on a schedule, event trigger, or other scheme. Such an environment may include a scaling service configured to produce or terminate virtual machines upon the occurrence of predetermined events. For example, if one or more virtual machines fail, such as due to a power failure of the physical computing system hosting the one or more virtual machines, the scaling service may be configured to automatically launch replacements for the failed one or more virtual machines. Similarly, if a load on a set of virtual machines exceeds the threshold, the scaling service may launch and add one or more additional virtual machines to the set to balance the load of the set of virtual machines. Conversely, if the load on a set of virtual machines falls below a threshold, the scaling service may de-provision one or more virtual machines in order to ensure that computing resources are not unnecessarily idle. In some examples, "de-provisioning" may refer to the act of removing access to a virtual machine and freeing up resources allocated to the virtual machine. De-provisioning a virtual machine may include stopping the virtual machine from running, making any resources (e.g., memory, processing capacity, etc.) allocated to the virtual machine available to other processes of the device, and removing images, or other files dedicated to the virtual machine, from persistent storage. In order for the virtual machines to be scaled up or down by the scaling service, they may be configured such that primary or mutable may be stored in persistent storage separate from but accessible by the virtual machines.

In embodiments of the present disclosure, the scaling service is configured to terminate and re-launch virtual machines for security purposes. For example, each virtual machine of a set of virtual machines may be configured to expire after running for one hour, whereupon the virtual machine may be de-provisioned and a new virtual machine instantiated in its place, thereby limiting the amount of time available for an unauthorized entity to compromise the security of the virtual machine and limiting the duration of any security breach of a virtual machine. In some implementations, the scaling service is configured to terminate and re-launch a virtual machine if an intrusion detection component of the service indicates that security or integrity of the virtual machine may have been compromised. In other implementations, the scaling service is configured to terminate and re-launch a virtual machine upon the detection of an error occurring within the virtual machine (e.g., software errors, operating system errors, memory errors, or other hardware or software errors).

In embodiments of the present disclosure, information related to the state of the virtual machine prior to termination are preserved. This information may be preserved by performing a set of updates to a block storage device, database, or some other data storage resource. For example, in some embodiments, prior to the termination of a virtual machine, a snapshot of the virtual machine is captured and stored as the information. Additionally or alternatively, in some embodiments the information includes a memory dump, such as a dump of the memory of the host computing system of the virtual machine. In some of these embodiments, the memory dump only includes pages of memory that have changed from an initial state; for example, binary differences between a memory dump of a baseline virtual machine (also referred to as an exemplary virtual machine) taken at a similar point in its lifecycle as the current virtual machine may be stored. In some implementations, software configured to detect the set of differences between a pair of states or a pair of snapshots may be configured to detect whether certain differences are irrelevant and omit such differences from the result.

In some embodiments, certain portions of the memory are read only or copy-on-write; that is, the certain portions may be governed by a memory protection policy whereby the certain portions are immutable (i.e. cannot be modified) once written to. In this manner, executable code common to a base virtual machine and other virtual machines can be assured to be unmodified and identical from virtual machine to virtual machine, thereby ensuring that when virtual machines and the base virtual machine are compared in accordance with the present disclosure, the immutable memory regions are excluded from the sets of differences. This may provide advantages in calculating the sets of differences, in copying and storing the set of differences, and in reduction of the size of the set of differences. Furthermore, in some implementations of these embodiments, some of these portions of memory may be allocated specifically for certain applications or other processes (e.g., certain common operating system processes, etc.). In this manner, certain executable code may always be found in the same virtual memory locations from virtual machine to virtual machine, including the baseline virtual machine, so that when differences are determined between a current virtual machine and another virtual machine (e.g., the baseline virtual machine) such virtual memory locations should be identical and therefore excluded from the set of differences.

In some embodiments, the information stored is the set of differences between the current state of the virtual machine and the initial state of the virtual machine. For example, a snapshot of the current virtual machine may be captured and compared with a base snapshot of identically configured virtual machines to determine differences between the captured snapshot and the base snapshot, and these differences may be stored. Similarly, the captured snapshot may be compared with one or more captured snapshots of other virtual machines to determine whether the captured snapshot deviates materially from a majority of the one or more other captured snapshots.

In some embodiments, the stored information provides the ability to restore the terminated virtual machine to the state it was in prior to being terminated. For example, the set of differences calculated between that state and the initial state may be combined with the initial state to yield the state of the virtual machine at the time of termination. In embodiments, the information is compared to a known good configuration (e.g., a baseline snapshot of an exemplary system). In some embodiments, the event that triggers the preservation process (snapshot capture and storage of the snapshot) is a virtual machine with a bounded lifespan reaching the end of its lifecycle. Predetermined events may also be based at least in part on work-related metrics. For example, some other predetermined events that trigger the preservation process include that the virtual machine has processed a specified number of requests, that the virtual machine has generated a threshold amount of data, or that a threshold amount of time has passed since the last request received by the virtual machine.

In some embodiments, the instructions to the storage subsystem to persist this data includes an indication of a retention period for the data. For example, stored information indicating the state of the virtual machine at a time that the virtual machine was terminated or indicating differences between the state and an initial state at this time may be tagged to be retained for 30 days. In some embodiments, an application programming interface for triggering or scheduling termination and capture in the manner described in the present disclosure is provided by a computing resource service provider providing the virtual computing system service, and the time period for retaining the information may be passed as a parameter to the application programming interface. For example, such an application programming interface may allow an administrator of a set of virtual machines to specify a predetermined event and specify that a set of local changes are to be captured upon the occurrence of the predetermined event.

Figure 2:
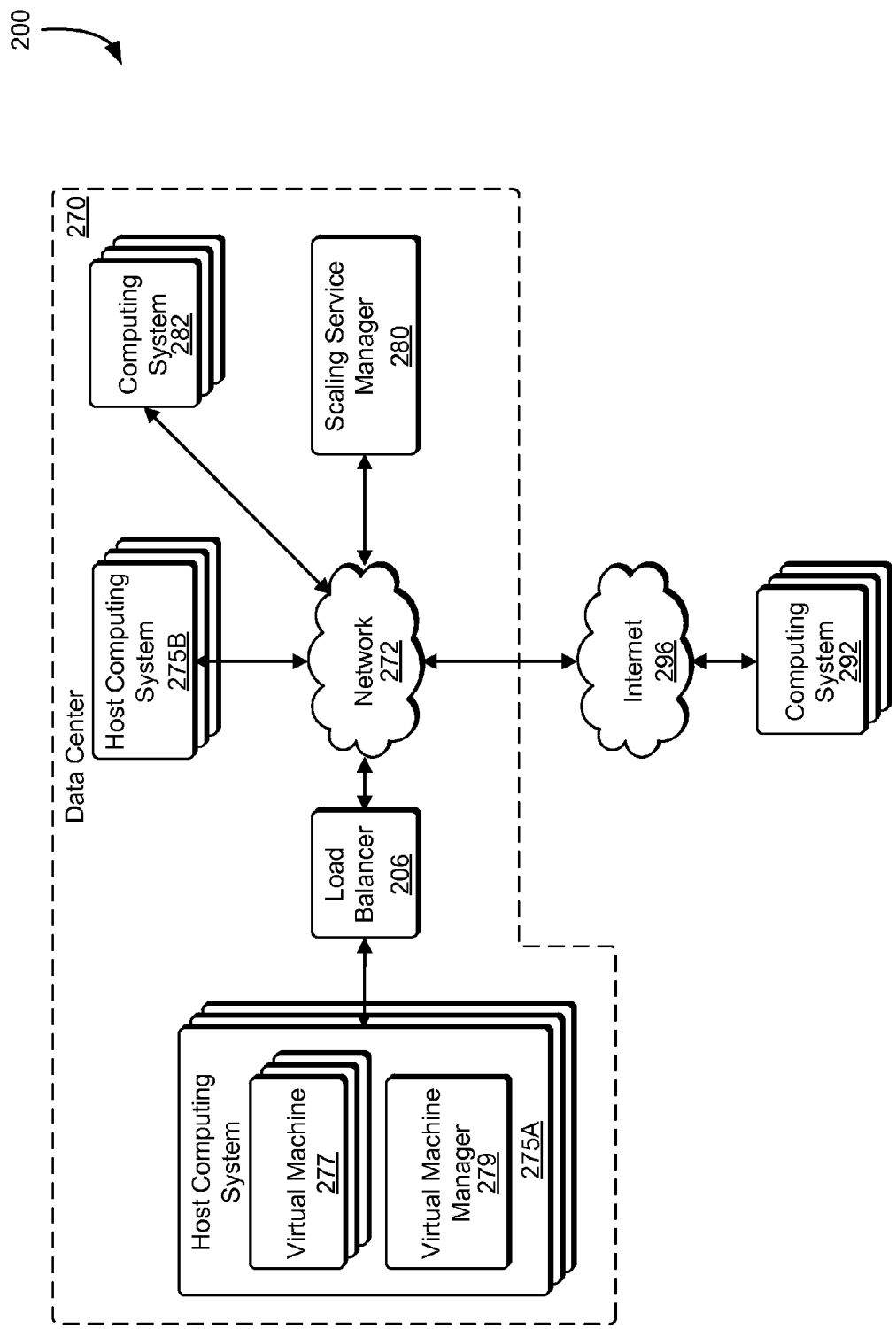
FIG. 2 illustrates an example of a data center with host computers managed by a scaling service in accordance with an embodiment.

FIG. 2 illustrates an embodiment of an environment 200 in accordance with the present disclosure in which a scaling service may be provided using one or more data centers that include multiple physical computing systems. In particular, FIG. 2 is a network diagram illustrating an environment 200 in which a scaling service manager 280 of a scaling service manages execution of one or more programs on behalf of users using various computing systems at the one or more data centers. The environment includes a data center 270 used by the scaling service, which is connected to an Internet 296 external to the data center 270. In this environment 200, the Internet 296 provides access to various external computing systems, such as a computing systems 292. The set of computing systems 292 may include, for example, a home computing system that connects directly to the Internet (e.g., via a telephone, cable modem, Digital Subscriber Line (DSL), etc.).

The scaling service may be configured to automatically scale the capacity of a collection of previously requested virtual machines 277 up or down based at least in part on circumstances defined by the customer that requested the virtual machines 277. The previously requested virtual machines 277 may be members of an auto-scaling group allocated to the customer. Using the auto-scaling group, a group of computing nodes can have their numbers increased or decreased according to predefined conditions (e.g., processing unit load falling above or below a specified threshold, etc.). For example, the scaling service manager 280 may decrease the number of virtual machines 277 in the auto-scaling group during low demand by removing or terminating some virtual machines from the group, and increase the number of virtual machines 277 in the auto-scaling group during demand peaks by instantiating or adding virtual machines to the auto-scaling group. In some embodiments, the customer may provide, such as through a web interface or application programming interface, the conditions that cause virtual machines to be added or removed from the auto-scaling group. In this manner, the virtual computing capacity can be increased or decreased according to conditions specified by customer.

For example, the scaling service manager 280 may determine that the quantity of virtual machines requested by the customer is redundant and/or excessive. In response, the scaling service manager 280 may cause a certain number of virtual machines 277 allocated to the customer to be terminated such that the remaining number of virtual machines 277 allocated to the customer is not redundant and/or excessive. Similarly, the scaling service manager 280 may cause the number of virtual machines 277 to increase during a period of high usage. In one embodiment, the scaling service manager 280 can increase the number of virtual machines 277 if the usage rate exceeds a predetermined threshold.

The example data center 270 includes a number of physical host computing systems (host computing systems 275A-75B a scaling service manager 280 of the scaling service. In this environment 200, the host computing systems 275A-75B each provide multiple virtual machines 277 and have a virtual machine manager 275 to manage those virtual machines (e.g., a hypervisor or other virtual machine monitor). The other host computing systems 275B may similarly include such components, but those other components are not illustrated here for the sake of brevity. Each of the virtual machines provided by a host computing system may be used as a distinct computing node for the scaling service, such as to have a first virtual machine computing node on a host computing system be part of a first computing node group for a first user, and to have a second virtual machine computing node on that same host computing system be part of a second computing node group for a second user.

In some embodiments, various members of the computing systems 275A-75B may have differing capabilities, may have different associated fees for use, may support different types of user programs (e.g., virtual machine software image instances of different sizes, or programs with different types of resource criteria and/or computing resource usage, such as differing patterns of I/O and memory access and network usage), etc. If so, particular users and/or their programs may be grouped (e.g., automatically) according to one or more such factors, which may further be used as constraints and/or preferences regarding which computing systems to select for executing particular programs. The example data center 270 further includes an internal network 272 that may include multiple networking devices (not shown), such as switches, edge routers, and core routers, with computing systems 275A-75B, and the scaling service manager 280 connected to the internal network 272. The various host computing systems 275A-75B may be arranged in various manners, including by being grouped in racks that share common backplanes or other interconnection mediums. Furthermore, the scaling service manager 280 may be executed using one or more computing systems (not shown). The scaling service manager 280 may include software instructions stored in memory, which, when executed by one or more processors, manage program execution capacity for the scaling service.

The scaling service manager 280 may instruct the virtual machine manager 279 to instantiate virtual machines 277 based on a set of preferences provided by a customer owner of the virtual machines. In some examples, "owner," in this context may refer to an entity, different from the computing resource service provider, to which the virtual machine is provided. The customer owner, in this sense, may include customers authorized to use the virtual machine through license, lease, or full ownership. For example, the scaling service manager 280 may receive, from the customer, a request to instantiate one or more virtual machines 277 with a bounded lifetime. Additionally, the request received from the customer may also indicate a time to start execution of the requested virtual machines 277. In response to receiving the request, the scaling service manager 280 may instruct the virtual machine manager 279 to instantiate the virtual machines 277, and may also automatically instruct the virtual machine manager 279 to terminate the instantiated virtual machines 277 after a duration specified by the customer. For example, the scaling service manager 280 may monitor the time of existence of the virtual machines 277 and cause the virtual machines 277 to be terminated when the life of the virtual machine 277 corresponds to the indicated bounded lifetime by sending a signal to the virtual machine manager 279, which in turn can terminate the virtual machine.

The illustrated scaling service manager 280 performs at least some of the described techniques in order to manage execution of programs on groups of computing nodes (e.g., auto-scaling groups) that are provided using the first and second host computing systems 275A-75B. In embodiments of the present disclosure, an auto-scaling group can be configured with the property that indicates that all members of the group should have their state changes from an initial snapshot or from a base snapshot stored to persistent storage prior to termination in the manner described in the process 600 of FIG. 6. In other words, the auto-scaling group may be configured with a property or other configuration that causes the current state of the virtual machine to be saved upon the removal of a virtual machine from the group. In this case, an occurrence of the removal of the virtual machine from the group is the triggering event.

When a particular computing node is selected to execute one or more programs of a user, the scaling service manager 280 may, in some embodiments initiate execution of those programs by interacting with the virtual machine manager 279 or other manager component that controls execution of programs for that selected computing node, or may alternatively directly execute the programs on the selected computing node. Users of the scaling service may use various computing systems to interact with the scaling service manager 280, such as the set of computing systems 292.

It will be appreciated that the data center of FIG. 2 is provided for illustrative purposes only, and that scaling services and other software execution services may be provided in other manners in other embodiments. For example, scaling service manager 280 may instead be provided using one or more other computing systems external to the data center 270, such as the set of computing systems 292.

The virtual machine manager 279 may be a virtualization layer of a hosted computing system 275A that may enable the physical hardware of the host computing system 275A to be used to provide computational resources upon which the virtual machines 277 may operate. The virtualization layer may be any device, software or firmware used for providing a virtual computer platform for the virtual machines 277 and configured to manage the execution of the virtual machines 277 on the host computing system 279A. An example of a virtual machine manager 279 is a hypervisor. The virtual computer platform may include various virtual computer components, such as one or more virtual processors, virtual memory, and virtual devices. The virtual machines 277 may be provided to customers of the computing resource service provider, and the customers may run operating systems, applications and/or other such computer system entities on the virtual host.

At least one of the virtual machines 277 may be a controlling domain. The controlling domain may be a privileged virtual machine instance from which the one or more of the virtual machines 277 may be managed. Unlike the other virtual machines 277, the controlling domain may have direct access to the physical hardware (e.g., network interface controllers, hard drives, memory, etc.) of the host computing system 276A. As discussed above, each of the virtual machines 277 may be configured to execute all or a portion of an application. The network 272 environment may span one or more data centers similar to the data center 270, where each data center may be geographically distinct from each other. Additionally, the environment 200 shown in FIG. 2 may be one of several embodiments employed by the distributed computing resource provider.

The set of host computing systems 275A may be assigned to a particular customer of a computing resource service provider (with the host computing systems 275B representing one or more sets of host computing systems assigned to other customers). The customer may configure a desired capacity for the set of host computing systems 275A, which may be configured to execute one or more software programs on behalf of the customer. The customer may also specify a scaling trigger, which may be used by the scaling service to initiate automated modifications to the capacity of the set of host computing systems 275A. The capacity modification trigger may include a capacity quantity to change if the capacity modification trigger is satisfied. For example, if the average load of work being performed by the virtual machines 277 of the set of host computing systems 275A rises above a certain threshold, the scaling service manager 280 may be configured to instruct the appropriate virtual machine managers to instantiate additional virtual machines on the respective host computing systems. Similarly, if the average load of work being performed by the virtual machines 277 of the set of host computing systems 275A falls below a certain threshold, the scaling service manager 280 may be configured to instruct the appropriate virtual machine managers to terminate excess additional virtual machines on the respective host computing systems. Likewise, if the set of host computing systems 275A are operating at capacity and additional capacity is needed, the scaling service manager 280 may be configured to add additional host computing systems to the set of host computing systems 275A. In this manner, load balancing may be automatically performed by scaling up or down the resources needed to perform the work. In accordance with the present disclosure, the scaling service manager 280 may additionally be configured to manage computing nodes with finite lifespans. That is, the virtual machines 277 may be configured to execute, run, and terminate after running for a fixed duration (e.g., one hour, ten minutes, 48 hours, one week, etc.). Thus, the scaling service manager 280 may track the time that each of the virtual machines 277 has been alive, and, upon reaching the end of a particular virtual machine's lifespan, may instruct the virtual machine manager 279 to terminate the particular virtual machine. The scaling service manager 280 may additionally instruct the virtual machine manager 279 to launch a new virtual machine 277 in place of the one that was just terminated.

Each of the virtual machines 277 may be launched from a base software image configured for those virtual machines 277. In some cases, a replacement virtual machine may not be launched unless the additional capacity is needed (as described above). Note that other triggers may be used to cause termination and replacement of virtual machines 277, such as an intrusion being detected, execution errors, and express instructions to do so, such as from the customer, system administrator, or other authorized entity.

In embodiments, the load balancer 206 receives requests allocating work to the virtual machines 277, such as from the customer, from the set of computing systems 292 seeking to access the virtual machines 277, or from other authorized entities. The load balancer 206 may receive the request for allocating work to the virtual machines 277, determines a virtual machine of the virtual machines 277 that can respond to the request, and then forward the request to the determined virtual machine.

To this end, the load balancer 206 determines whether one or more virtual machines 277 have a bounded lifetimes. Responsive to this determination, the load balancer 206 determines whether those virtual machines 277 are scheduled to shut down, restart, terminate, and/or otherwise become unavailable within a threshold amount of time. In one embodiment, the load balancer 206 communicates with the scaling service manager 280 to ascertain whether the virtual machines 277 are scheduled to be terminated within the threshold amount of time. For example, the scaling service manager 280 may monitor the lifetimes of the virtual machines 277 for scheduling termination of a virtual machine, as described above. If the load balancer 206 determines that the virtual machine will remain active and/or available for beyond the threshold amount of time, then the load balancer 206 may forward the request to the virtual machine. If the load balancer 206 determines that a virtual machine will not be active and/or available within the threshold amount of time, then the load balancer 206 may not forward the request to the respective virtual machine. In this case, the load balancer 206 proceeds to another virtual machine to determine whether the virtual machine is available for a threshold amount of time. Accordingly, the load balancer 206 prevents requests from being forwarded to virtual machines 277 scheduled to become unavailable within a threshold amount of time.

Figure 3:
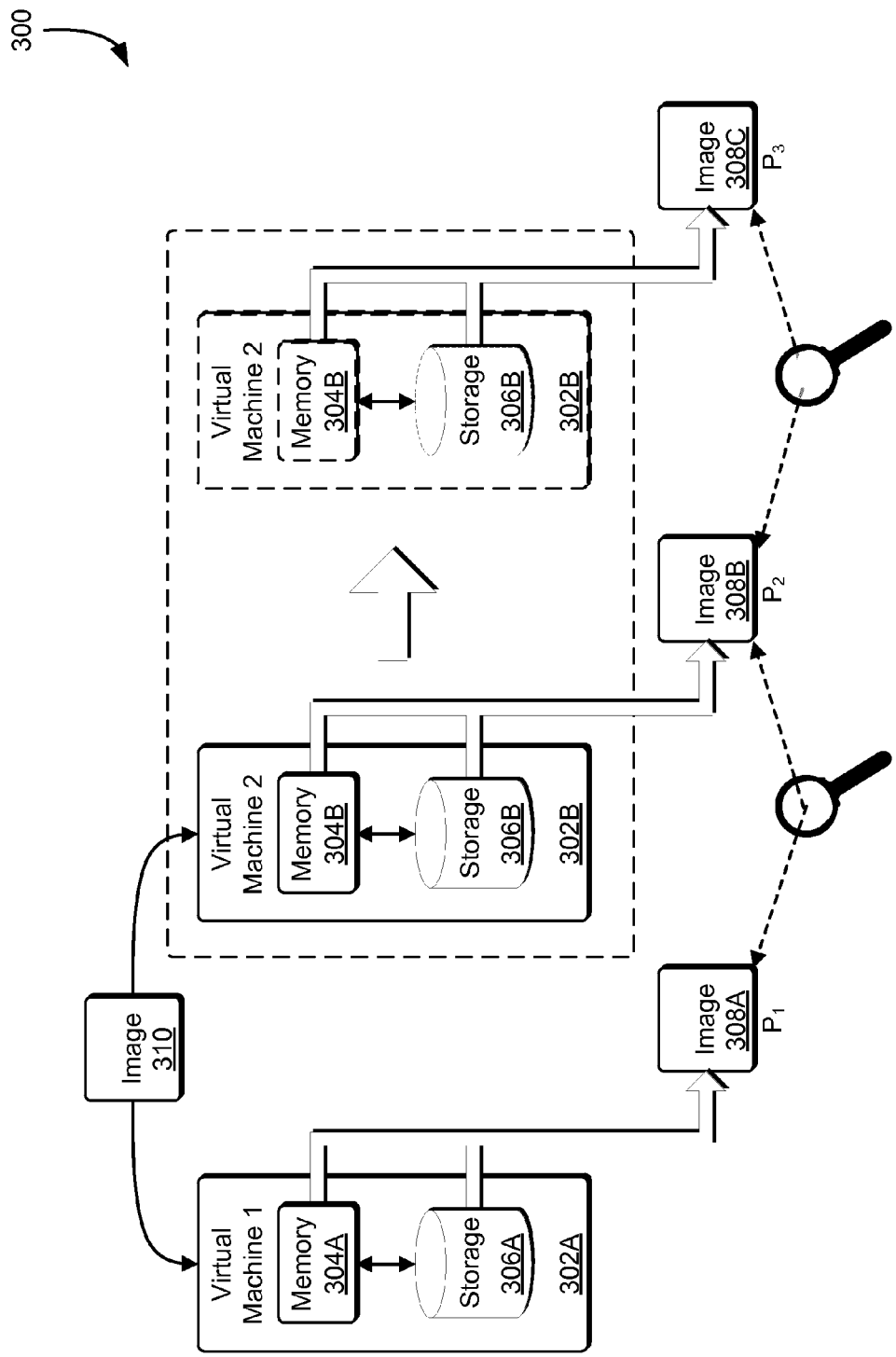
FIG. 3 illustrates an example of capturing forensic snapshots in accordance with an embodiment.

FIG. 3 illustrates an aspect of an environment 300 in which an embodiment may be practiced. As illustrated in FIG. 3, the environment 300 may include instantiations of the first and second virtual machines 302A-02B from a base image 310, each having sufficient and identical resources, such as first and second virtual memories 304A-04B and first and second storages 306A-06B, for performing the tasks for which they were configured to perform, and capturing snapshots 308A-08B. The first virtual machine 302A and the second virtual machine 302B may be virtual machines (that is, emulations, in software and/or hardware of a physical computer system, such that software executing in the virtual machine environment behaves as if the virtual machine were a physical computer) provided to a customer through a virtual computer system service of a computing resource service provider, and configured to perform computing tasks for the customer. Note that, the first and second virtual machines 302A-02B may reside on the same or different physical host computing system.

The first and second virtual memories 304A-04B may be memories having virtual memory addresses that may be mapped to physical address space in the computer memory of the respective host computing systems of the first and second virtual machines 302A-02B. The storages 306A-06B may be storage volumes for persistently storing data of the respective first and second virtual machines 302A-02B. The storages 306A-06B may be storage such as databases, block level storage, or archival storage.

The base image 310 may be a snapshot of a state of a computer system at an initial point in time (e.g., at a point in time early in the lifecycle of the virtual machine, such as upon completion of a bootup process, upon an initial attempt to connect to a certain network location, etc.). For example, the base image may include an installation of an operating system and software for performing tasks of the customer, and the base image may further be configured with various settings, such as settings for connecting to a particular network. The base image 310 may be configured to be instantiated into one or more virtual machines (a scaling service), such as the scaling service described in conjunction with FIG. 2, may utilize the base image 310 to instantiate the finite instances (i.e., virtual machines with bounded lifetimes) when it provisions or de-provisions its finite instances.

In the environment 300, the first virtual machine 302A, having the memory 304A and the storage 306A, may be instantiated with the base image 310. The first virtual machine 302A may be isolated from other machines by blocking communications to/from a network, although the first virtual machine 302A may be allowed to communicate with storage devices. The first virtual machine 302A may be started and allowed to run until reaches a certain stage; for example, the first virtual machine 302A may be started and allowed to run until its processor reports that its system processes are idle above a threshold percentage, allowed to run until all startup software applications have been fully loaded, allowed to run until a predetermined sequence of instructions are detected to execute, or allowed to run until a read or write to a fixed location in storage or memory is detected. Once this certain stage is detected, the first snapshot 308A may be taken of the state of the first virtual machine 302A and saved to persistent storage.

The first snapshot 308A may represent an initial state at this certain point in time after startup, and in this sense, the first snapshot 308A may be considered a baseline snapshot. In some implementations, the base image 310 may be the baseline snapshot. Once the first snapshot 308A has been stored, the first virtual machine 302A may be terminated and de-provisioned. The process may then be repeated for the second virtual machine 302B. That is, the second virtual machine 302B, having the memory 304B and the storage 306B, may also be instantiated with the base image 310, isolated (also referred to as "fenced"), and allowed to run until it reaches the certain stage. Upon reaching the certain stage, the second snapshot 308B may be taken of the state of the second virtual machine 302B. In some embodiments, this second snapshot is saved to storage (e.g., memory, local storage of the second virtual machine 302B, block storage device, database, etc.).

Thus, the first and second snapshots 308A-08B represent states of first and second virtual machines 302A-08B at the same stage. At this point, a first delta of the set of differences between the second snapshot 308B and the first snapshot 308A may be calculated:

$$\Delta_1 = f(P_2, P_1).$$

Where $P_1$ is the first snapshot 308A and $P_2$ is the second snapshot 308B. The first delta may then be stored in persistent storage, and, in some embodiments, the second snapshot 308B is discarded or deleted. The first delta may be usable to re-create the state of the second virtual machine 302B as it was at the certain stage, for example by taking the first snapshot 308A and overlaying it with the first delta to regenerate the second snapshot 308B. Once the second snapshot 308B is stored, the input/output of the second virtual machines 302B may be unfenced (i.e., unblocked) and allowed to connect to one or more networks.

At a later point in time, a request to terminate the second virtual machine 302B may be received by the virtual computer system service, such as from a scaling service as described in the present disclosure. Upon receipt of the termination request, the second virtual machines 302B may once again be fenced from networks so that it no longer can receive inbound network request, and the virtual processor may be frozen (e.g., by no longer scheduling processes for the virtual machine, the virtual machine is allowed to enter an idle state). The second snapshot 308B may be obtained at this time; depending on the embodiment, in some cases the second snapshot 308B may be retrieved from storage, whereas in other cases the second snapshot 308B may be regenerated by combining the first snapshot 308A with the first delta. At this point, a second delta of the set of differences between the state of the second virtual machine 302B prior to termination as may be captured by the third snapshot 308C, and the second snapshot 308B may be calculated:

$$\Delta_2 = f(P_3, P_2).$$

Where $P_3$ is the state of the second virtual machine 302B prior to termination (or third snapshot). The second delta may then be stored in persistent storage, and the third snapshot 308C may be deleted or discarded. In some implementations, rather than storing the first and second deltas, the second and third snapshots 308B-08C may be stored instead. However, storing the first and second deltas instead of full snapshots, may minimize storage requirements for the environment 300, which may be critical for environments where many (e.g., 100, 1,000, 10,000, etc.) virtual machines of the type as the second virtual machine 302B may be running in parallel. For example, in an environment having 1,000 virtual machines running in parallel, rather than storing 1,000 second snapshots 308B and 1,000 third snapshots 308C, only 1000 first deltas and 1000 second deltas need be stored. In some cases, the size of the deltas (e.g., the set of local changes) may be of a size from 1% to 25% of the size of a full snapshot of the virtual machine.

The snapshots may include the contents of the memory address space allocated to the respective virtual machines as well as the contents of the storages 306A-06B, such as the contents of logical block addresses of connected block storage. The memory address space may be the physical address space provided to the virtual machine by its virtualization layer, such as a hypervisor. In some implementations, the contents of the memory 304A and the contents of the storage 306A may be stored together in the first snapshot 308A, while in other implementations the contents of the memory 304A and the contents of the storage 306B may be stored in separate snapshots in association with each other (but cumulatively called the first snapshot 308A). This also applies to the second snapshot 308B.

In some embodiments, there could already be a record of what was written to the storages 306A-06B and when. In such embodiments, the entire contents of the storage 306B need not be included in the third snapshot 308C of the second virtual machine 302B since the set of differences between the storage 306B at a time of the second snapshot 308B and the storage 306B at a time of the third snapshot 308C may be determinable from the record of rights to the storage 306B.

Figure 4:
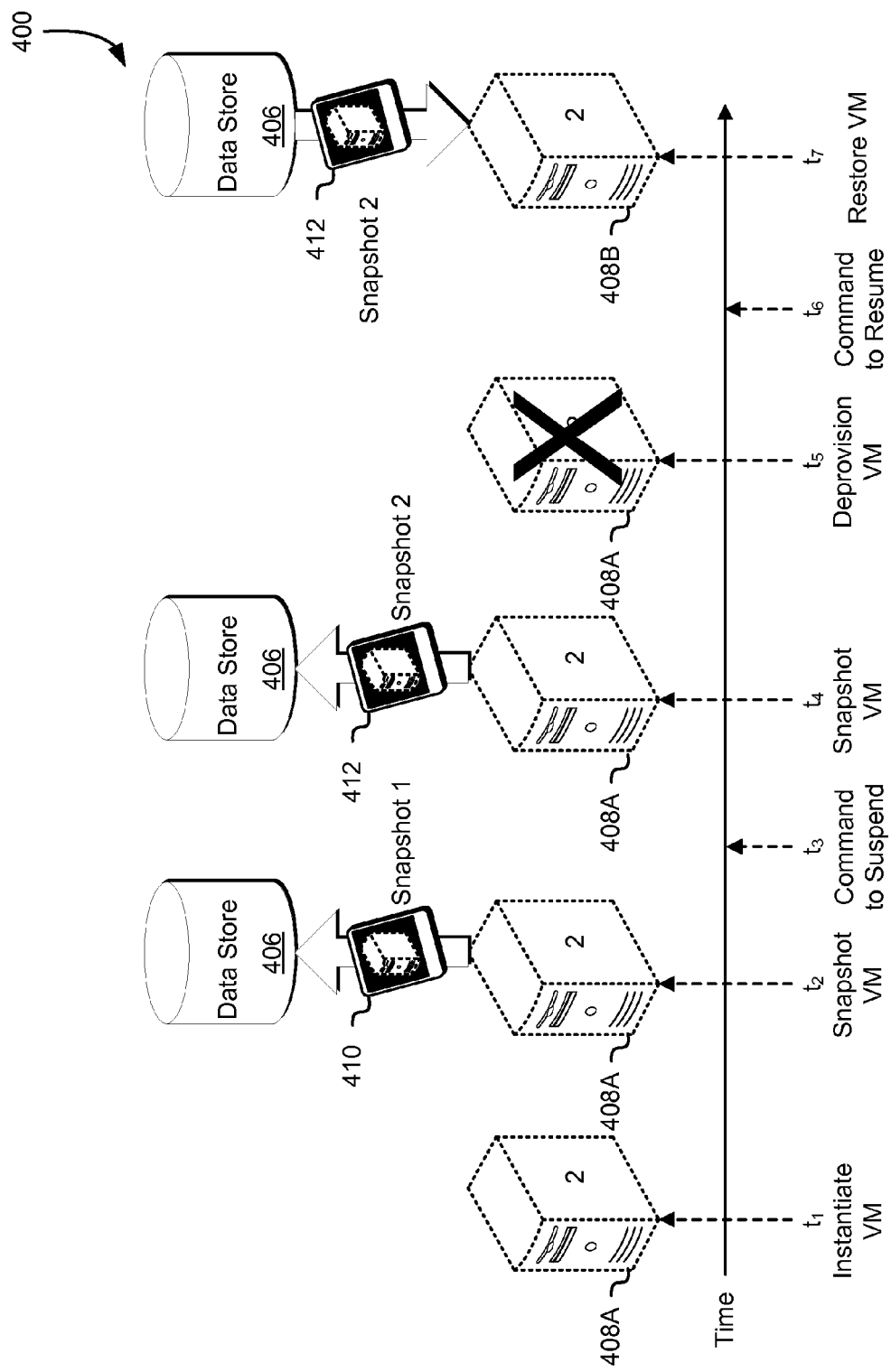
FIG. 4 illustrates an example of suspend and resume of virtual machines in accordance with an embodiment.

FIG. 4 illustrates an aspect 400 of an embodiment of the present disclosure. FIG. 4 depicts instantiation of a virtual machine, persisting a state of the virtual machine upon receipt of a suspension command, terminating and de-provisioning the virtual machine, and, upon receiving a command to resume, restoring the virtual machine to its previous state. The data store 406 may be any type of storage medium sufficient for storing snapshots or differences between snapshots, similar to the data store 106 described in FIG. 1. The virtual machine 408A may be a virtual machine instantiated from a base image common to a set of virtual machines of a customer of a computing resource service provider, similar to the at least one virtual machine 108 described in conjunction with FIG. 1. At time $T_1$, the virtual machine 408A may be instantiated from the base image. Then, at time $T_2$, an initial snapshot 410 of the virtual machine 408A may be captured. The initial snapshot 410 may be a snapshot of the state of the virtual machine 408A at time $T_2$. In some embodiments, the entire snapshot is saved to the data store 406. In other embodiments, only the differences between the initial snapshot 410 and a base snapshot of an exemplary virtual machine is stored in the data store 406. In either case, the information stored in the data store 406 may be usable at least in part to restore the state of the virtual machine 408A at time $T_2$. This process may be similar to the processes for capturing forensic snapshots described in FIGS. 1 and 3.

Distinguished from the snapshots of FIGS. 1 and 3, at time $T_3$, a command may be received to suspend the virtual machine 408A. Such a command may be a command from a customer owner of the virtual machine 408A, from an authorized application, from the computing resource service provider, or from a service of the computing resource service provider authorized to suspend and/or restore virtual machines like the virtual machine 408A, such as a scaling service described in conjunction with FIG. 2.

In response to the suspension command, the virtual machine 408A may be isolated from a network and/or removed from a group of virtual machines being load balanced such that the virtual machine 408A may appear as off-line. Another snapshot of the virtual machine 408A, referred to here as the suspension snapshot 412 may be captured. The suspension snapshot 412 may be a copy of the state of the virtual machine 408A at time $T_4$. In some embodiments, the entire snapshot is saved to the data store 406, while in other embodiments, only the set of local changes between the suspension snapshot 412 and the initial snapshot is saved to the data store 406. In either embodiment, the information saved to the data store 406 may be usable at least in part to recreate a copy of the state of the virtual machine 408A at time $T_4$.

At this point, since the virtual machine 408A is effectively off-line and its suspension states stored, it may be de-provisioned at time $T_5$. Some time after time $T_5$, at $T_6$ a command may be received to resume the virtual machine. In response to the command to resume, the suspension snapshot 412 may be obtained from the data store 406. As noted, in implementations where the set of local changes are stored to the data store rather than the entire suspension snapshot 412, the suspension snapshot 412 may be obtained by combining the set of local changes with the initial snapshot 410, (which in turn may be obtained by combining the set of differences between the initial snapshot 410 and a base snapshot with the base snapshot). A new virtual machine 408B may then be instantiated from the obtained suspension snapshot 412 at time $T_7$, thereby restoring/configuring the new virtual machine 408B to the state of the suspended virtual machine 408A as it was prior to being suspended. Further details about resuming the virtual machine may be found in the description of the process 900 of FIG. 9.

Figure 5:
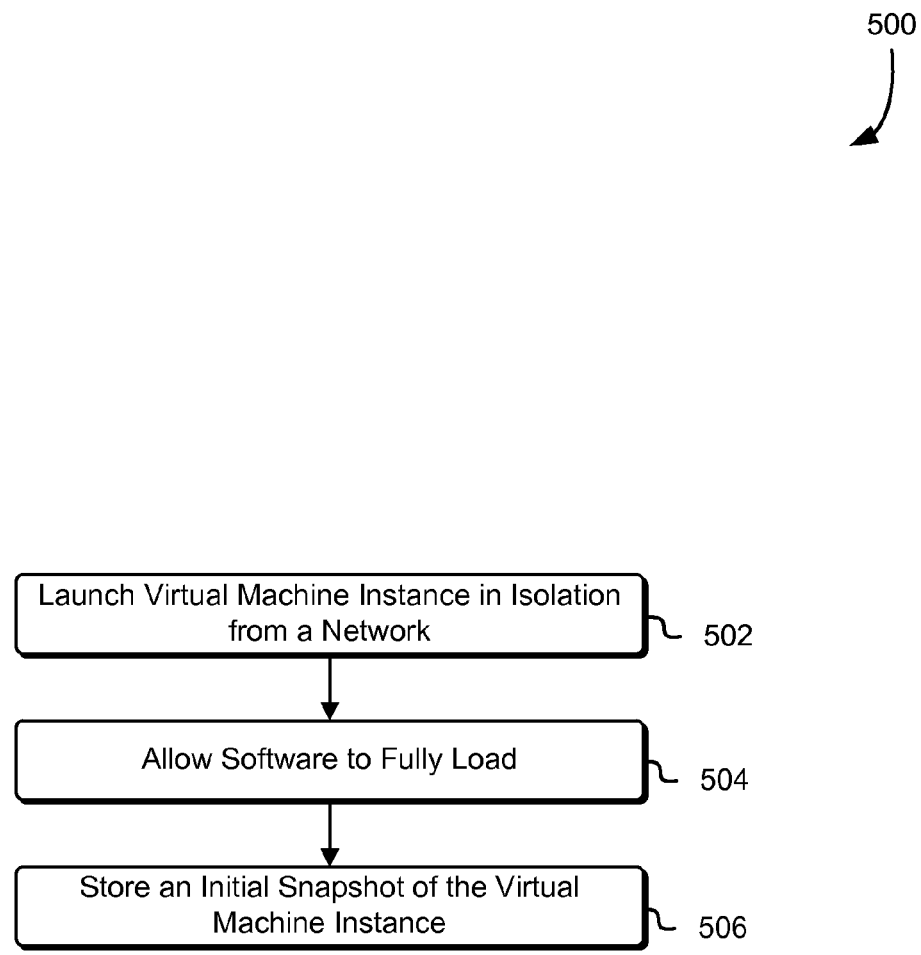
FIG. 5 is a block diagram that illustrates an example of generating a base or initial snapshot in accordance with an embodiment.

FIG. 5 is a block diagram illustrating an example of a process 500 for generating a base or initial snapshot in accordance with various embodiments. The process 500 may be performed by any suitable system such as a server in a data center, such as the web server 1006 or the application server 1008 of FIG. 10, multiple computing devices in a distributed system of a computing resource service provider, or any electronic client device such as the electronic client device 1002 described in conjunction with FIG. 10. The process 500 includes a series of operations wherein a virtual machine is launched in isolation from input/output, the virtual machine is allowed to settle into an initial state, and a snapshot of the virtual machine is captured and stored as the base snapshot.

In 502, a virtual machine may be launched from a base software image. The base software image may be a file containing software and configuration information, and may be configured for instantiation of multiple virtual machines in series or in parallel. The virtual machine may be blocked from certain types of input/output, such as being isolated from network communication from other virtual machines or other computer systems. In this manner, the state of the virtual machine may be un-influenced by external factors.

In 504, the virtual machine may be allowed to reach a predicted state. For example, the virtual machine may be allowed to run until the system performing the process 500 detects that the virtual machine has fully booted (e.g., all startup services, processes, and applications have fully loaded), until the system performing the process 500 detects that the virtual machine has settled into an idol state, or until the system performing the process 500 detects that the virtual machine has read from a predetermined memory or storage address, etc.

In 506, once the virtual machine has reached the predicted state, a base snapshot of virtual machine may be captured and stored to persistent storage, such as in a database. Note that the process 500 may be performed in a similar manner either for generating a base snapshot of an exemplary virtual machine of a particular set of virtual machines or for generating an initial snapshot for any of the particular set of virtual machines. Note, however, that because only the set of differences between an initial snapshot and the base snapshot may be needed for the purposes of the present disclosure, that the storage used for the initial snapshot may be less persistent or may not be persistent at all (e.g., may be deleted once it's respective virtual machine is de-provisioned). The snapshot may include a snapshot of the contents of the virtual memory of the virtual machine and the contents of local persistent storage, such as a network attached block level storage volume.

Figure 6:
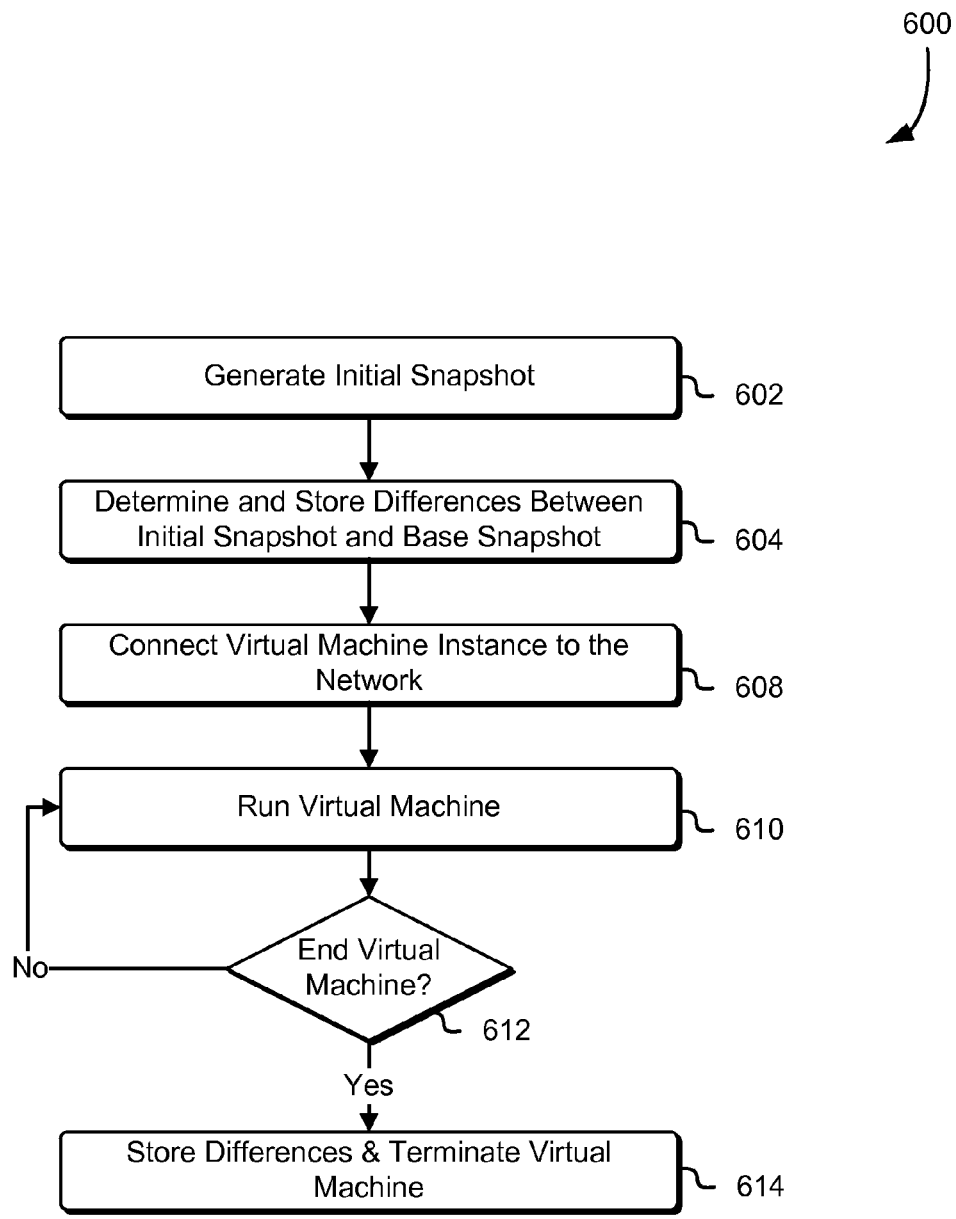
FIG. 6 is a flow chart that illustrates an example of generating a forensic snapshot in accordance with an embodiment.

FIG. 6 is a flowchart illustrating an example of a process 600 for determining and storing differences between a snapshot of a virtual machine captured prior to termination of the virtual machine and an initial snapshot of the virtual machine in accordance with various embodiments. The process 600 may be performed by any suitable system such as a server in a data center, such as the web server 1006 or the application server 1008 of FIG. 10, multiple computing devices in a distributed system of a computing resource service provider, or any electronic client device such as the electronic client device 1002 described in conjunction with FIG. 10. The process 600 includes a series of operations wherein, once a base snapshot is generated, allowing the virtual machine to communicate with the network and run the virtual machine until it is determined to terminate the virtual machine, capturing a snapshot of the state of the virtual machine, determining and obtaining differences between the state of the virtual machine and an initial state of the virtual machine, and terminating the virtual machine.

In 602, an initial snapshot of the virtual machine may be generated via a process similar to the process 500 described in conjunction with FIG. 5. Note that the process 600 presumes that a base snapshot of an exemplary virtual machine has already been generated or is being generated in parallel with 602. In 604, the set of differences between the initial state of the virtual machine and an initial state (e.g., the state of the exemplary virtual machine captured by a base snapshot at a similar point in the life of the virtual machine) are stored in persistent storage, such as in a database, as being associated with the particular virtual machine. By only storing the set of differences, resources may be conserved by avoiding storage of duplicate, irrelevant, and expected data between the exemplary virtual machine and the current virtual machine (e.g., instead of capturing 64 gigabytes (GB) of data, only capturing 10 GB of the most relevant data).

Once the set of differences are stored, in 608, the virtual machine is allowed to join the network to which it is configured to join. In 610, the virtual machine is allowed to run and perform the tasks it is configured to perform for a period of time. In some embodiments, this period of time is a duration set by a customer owner of the virtual machine, the computing resource service provider, or some other entity authorized to configure the time to terminate and launch virtual machines on behalf of the customer owner. For example, a scaling service, as described above, may be configured to allow the virtual machine to run for a fixed amount of time (e.g., 60 minutes), and then terminate the virtual machine (in some cases, instantiating a new virtual machine in its place). In other cases, the scaling service, virtual machine manager, or some other authorized entity may be configured to request termination of the virtual machine upon the occurrence of certain events, such as upon the occurrence of certain execution errors, upon the detection that the virtual machine is in and on authorized configuration (e.g., unauthorized software detected is being installed on the virtual machine, authorize software being modified from an approved configuration, etc.).

Thus, in 612, the system performing the process 600 may determine whether to terminate and de-provision the virtual machine, based on the occurrence of an event that triggers such action as described in the present disclosure. For example, an authorized entity, such as a customer owner of the virtual machine or an entity authorized by a customer owner of the virtual machine to administrate the virtual machine, may configure the event through an application programming interface provided by the computing resource service provider hosting the virtual machine. As a more specific example, a customer owner of the virtual machine may configure, through the application programming interface, the virtual machine to have a bounded lifespan of 60 minutes, and upon the event of reaching the age of 60 minutes, differences between the virtual machine at an initial state and at the current state should be stored, and the virtual machine should be terminated and replaced.

Examples of events include instructions to terminate a virtual machine from an entity external to the virtual machine, such as the scaling service manager 280, the virtual machine manager 279, or a controlling domain of the host computing system 275A of FIG. 2, or some other type of external entity such as a software application executing on a computer system different from the host computing system hosting the virtual machine. In embodiments, such external entities are unable to circumvent detection of an event triggering the process 600 and are unable to prevent storage of sets of differences or local changes and/or storage of snapshots. Furthermore, the external entities may be unable to delete or modify stored differences, local changes, and/or snapshots, and, in some cases, may have insufficient permissions to access the stored differences, local changes, and/or snapshots. In fact, in some embodiments, detection of an attempt to circumvent the process 600 may itself cause the process 600 to be performed; i.e., detection of an attempt to circumvent the process 600 may be one of the events that trigger performance of the process 600.

If the system determines that the virtual machine is not to be terminated, the system performing the process 600 may return to 610 to continue running the virtual machine. Otherwise, if the system determines that the virtual machines life should be brought to an end, the system performing the process 600 may proceed to 614, whereupon the system may determine differences between the final state of the virtual machine and the initial state of the virtual machine (described in further detail in FIG. 7). For example, if a scaling service is configured to terminate and de-provision one or more virtual machines if workloads fall below a minimum threshold, in the event workloads do fall below a minimum threshold the virtual machines being terminated and de-provisioned may be run through the process 600 prior to termination and de-provisioning.

Some embodiments of the present disclosure are configured to run in environments of virtual machines having bounded lifespans (i.e., virtual machine instances which have a fixed lifecycle and are terminated upon reaching the end of their lifecycle), which, upon reaching the end of their lifespans, are replaced by new virtual machines also having bounded lifespans. In these environments, after the virtual machine is terminated and de-provisioned in 614, a new virtual machine having a bounded lifespan may be automatically instantiated from the same base image as the previous virtual machine and the system performing the process 600 may repeat the process 600 for the new virtual machine. Additionally in such environments, the new virtual machine may be launched prior to or in parallel (i.e., concurrence) with the other operations of 614. Note that one or more of the operations performed in 602-14 may be performed in various orders and combinations, including in parallel.

Figure 7:
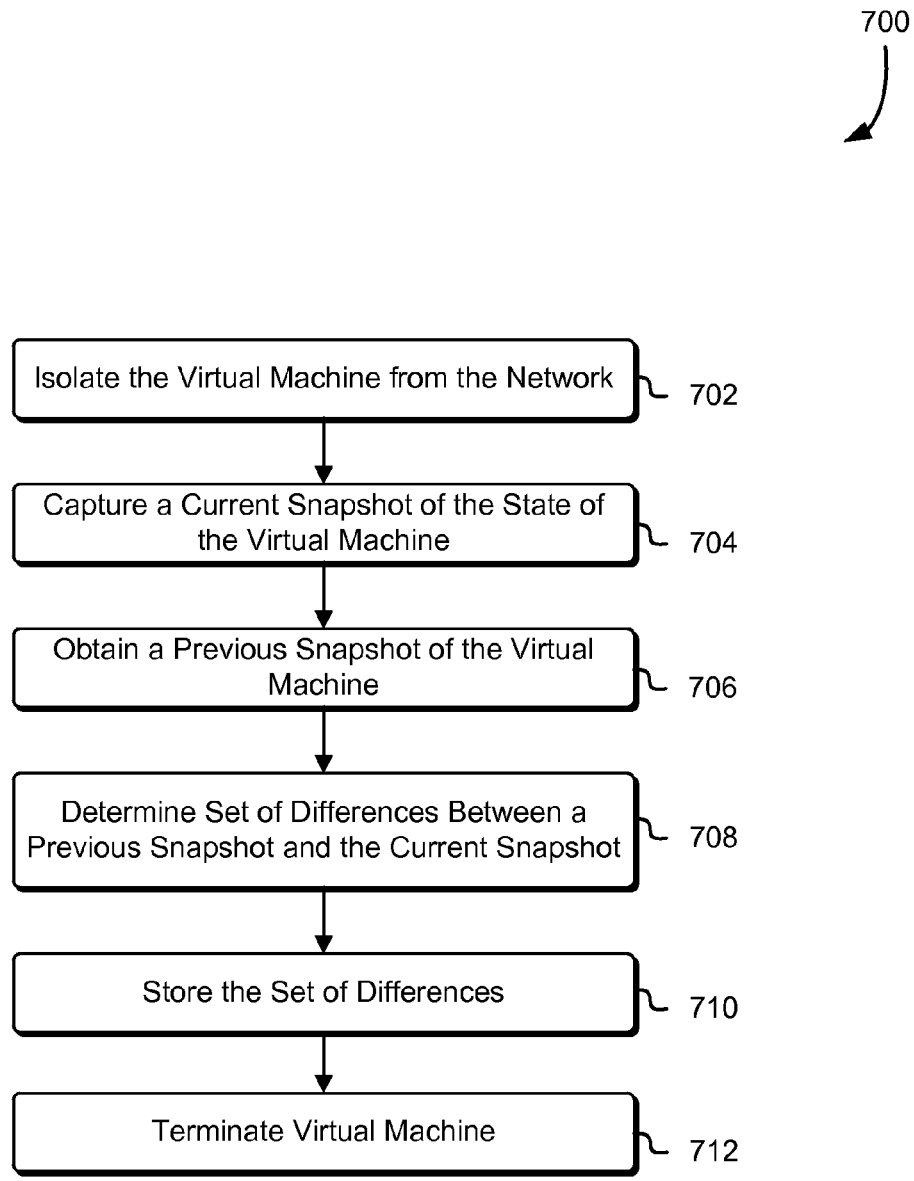
FIG. 7 is a block diagram that illustrates an example of storing a snapshot and terminating a virtual machine in accordance with an embodiment.

FIG. 7 is a block diagram illustrating an example of a process 700 for determining and storing differences between two states of the virtual machine, which may be usable in part in a forensic analysis of the virtual machine after termination in accordance with various embodiments. The process 700 may be performed by any suitable system such as a server in a data center, such as the web server 1006 or the application server 1008 of FIG. 10, multiple computing devices in a distributed system of a computing resource service provider, or any electronic client device such as the electronic client device 1002 described in conjunction with FIG. 10. The process 700 includes a series of operations wherein the virtual machine is isolated from its network, differences between the current state and a previous state are determined, the set of differences are stored, and the virtual machine is terminated and de-provisioned.

In 702, the virtual machine, which may currently be connected to a network of other computing systems, may be isolated from those computing systems. In some embodiments, isolation from other computing systems is accomplished by blocking incoming network traffic from certain sources from reaching the virtual machine. In other embodiments, removing the virtual machine from being managed by a load balancer, such as the load balancer 206 of FIG. 2, is sufficient to isolate the virtual machine from other computing systems. The virtual machine may be removed from being managed by the load balancer by blocking communication from the load balancer to the virtual machine or vice versa. The virtual machine may be allowed to complete the tasks that it is currently performing, but may be configured not to accept any new tasks.

In 704, a snapshot of the current state of the virtual machine is captured. Similar to the process for capturing the initial state of the virtual machine, the current snapshot may include the current states of the memory and storage of the virtual machine. In some embodiments, capturing the current state of the memory of the virtual machine includes capturing the content of the physical memory to which the virtual memory of the virtual machine has been mapped. Likewise, the current state of the storage may include the contents of logical block addresses of a storage device to which at least a portion has been attached to the virtual machine as a storage volume.

In 706, a previous snapshot (e.g., a copy of the initial snapshot generated in 602 of FIG. 6) of the virtual machine may be obtained. In some embodiments, the previous snapshot would have been stored in persistent storage after it was captured in 602. In other embodiments, a set of differences between previous snapshot and a snapshot taken prior to the previous snapshot (e.g., a base snapshot of an exemplary virtual machine) would have been stored to persistent storage instead. In the former case, the previous snapshot may be obtained from the persistent storage. In the latter case, the previous snapshot may be regenerated by combining the snapshot taken prior to the previous snapshot with the set of differences. Note that in some implementations, a series of differential snapshots may be taken throughout the lifetime of the virtual machine. In such implementations, reconstructing the previous snapshot may involve combining a full base snapshot with the set of differences and with all intervening sets of differences.

Once the previous snapshot is obtained, in 708, a set of differences between the current snapshot and the previous snapshot is determined. As noted, in some implementations, the set of differences are binary differences between the current snapshot and the previous snapshot. Similar to 604 of FIG. 6, in 710, the set of differences between the current state and the initial state of the virtual machine may be stored in association with the particular virtual machine. As noted, by only storing the set of differences, resources may be conserved by avoiding storage of duplicate, irrelevant, and expected data. Finally, in 712, the virtual machine may be terminated and its resources made available to be allocated to another virtual machine (i.e., de-provisioned).

In some embodiments, a virtual machine is required to undergo the processes 600 and 700, of FIGS. 6 and 7 respectively, as a prerequisite for the virtual machine joining a virtual private network. That is, a virtual machine attempting to connect to the virtual private network must first have an initial snapshot captured, and, when the virtual machine attempts to disconnect from the virtual private network, a final snapshot is captured and differences determined between the final snapshot and the initial snapshot. Note that one or more of the operations performed in 702-20 may be performed in various orders and combinations, including in parallel.

Figure 8:
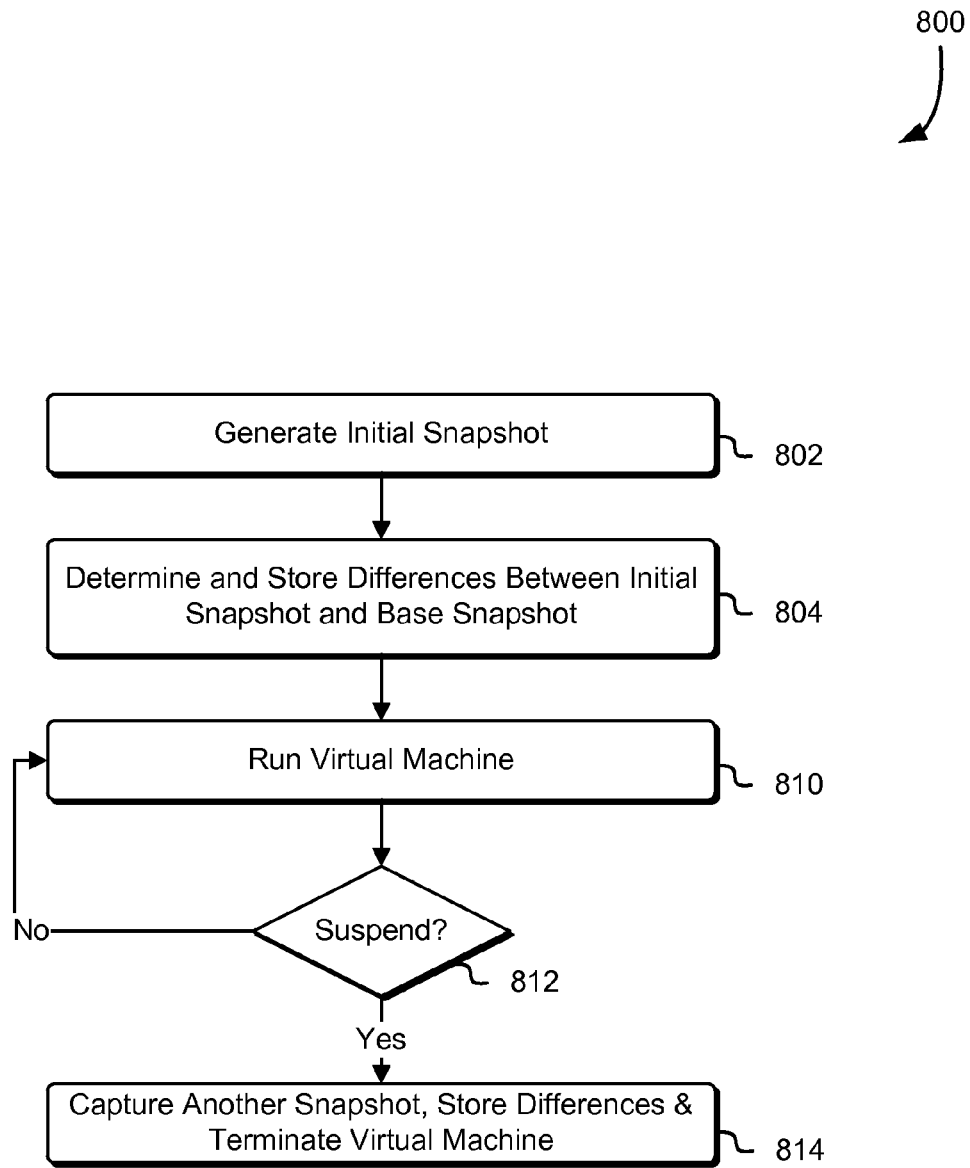
FIG. 8 is a block diagram that illustrates an example of suspending a virtual machine in accordance with an embodiment.

FIG. 8 is a flowchart illustrating an example of a process 800 for suspending a virtual machine in accordance with various embodiments. The process 800 may be performed by any suitable system such as a server in a data center, such as the web server 1006 or the application server 1008 of FIG. 10, multiple computing devices in a distributed system of a computing resource service provider, or any electronic client device such as the electronic client device 1002 described in conjunction with FIG. 10. The process 800 is similar to the process 600 of FIG. 6 with some exceptions. The process 800 includes a series of operations wherein an initial snapshot of the virtual machine is generated, differences between the initial snapshot and a base snapshot are stored, the virtual machine is run until a suspend instruction is received. Upon receipt of the suspend instruction, another snapshot of the virtual machine is captured, a set of local changes (i.e., differences) are determined between this snapshot and the initial snapshot, the set of local changes are stored, and the virtual machine is terminated.

In 802, an initial snapshot is captured of a virtual machine in a similar manner as described for 602 of FIG. 6. However, in some implementations, the process 800 does not include isolating the virtual machine from a network. One of the purposes for isolating a virtual machine from input/output prior to capturing an initial snapshot may be to ensure that the state of the virtual machine is not modified by the receipt of any communications through the network. In some implementations this may still be preferred, as the fewer differences there are between the initial snapshot and a base snapshot, the less storage will be required to store the set of differences.

In 804, the set of differences between this initial snapshot and the base snapshot, as obtained via the process 500 of FIG. 5 may be determined and stored in persistent storage in association with the particular virtual machine. Note that, in some implementations, the initial snapshot is stored in its entirety in addition to or instead of the set of differences. However, storing only the differences may provide the benefit of conserving storage resources, while still allowing the initial snapshot to be re-created by combining the base snapshot with the set of differences. Alternatively, in some embodiments, rather than capturing an initial snapshot (see FIG. 5) for each virtual machine (and, in some embodiments, storing the differences between the initial snapshot and a base snapshot), only a base snapshot of an exemplary virtual machine is captured (per process 500 of FIG. 5) at this stage. In such alternate embodiments, the set of local changes stored in 814 would be the set of differences between the snapshots of each virtual machine being suspended and the base snapshot. Likewise, the current snapshot of each virtual machine in such alternate embodiments may be restored in 908 of FIG. 9 by combining the set of local changes to the base snapshot of the exemplary virtual machine.

In 810, the virtual machine may be allowed to run as usual. In an implementation where virtual machine is isolated from a network prior to the initial snapshot capture, the virtual machine is allowed to connect to the network and receive requests prior to 810. In 812, the system performing the process 1100 determines whether a virtual machine should be suspended. This determination may be based on receipt of a request from a customer, computing resource service provider, or other entity authorized to suspend the virtual machine. In some cases, virtual machines may be suspended periodically or according to a schedule, or in response to the occurrence of a predetermined event. For example, a scaling service may choose to suspend virtual machines in the manner described in 800 during periods of low demand and resume the virtual machines at the state they were prior to the suspension during periods of high demand rather than terminating virtual machines during periods of low demand and restarting the virtual machines from scratch during periods of high demand. As another example, a first set of virtual machines performing a certain set of operations may be considered lower priority than a second set of virtual machines. In such an example, during periods where the first and second set of virtual machines are demanding the same set of resources, the first set of virtual machines may be suspended to allow the second set of virtual machines unhindered access to the resources, and once the demand for the resources by the second set of virtual machines has diminished, the first set of virtual machines may be resumed from their suspension.

If the system performing the process 800 determines that the virtual machine should not be suspended, the system may return to 810 to continue running the virtual machine as normal. Otherwise, if the virtual machine should be suspended, the system performing the process may proceed to 814, whereupon a snapshot of the current state of the virtual machine made to be captured in the manner described in the present disclosure and set of local changes between the current snapshot and the initial snapshot determined and stored in association with the virtual machine, similar to the process described in 700 of FIG. 7.

As noted above, in some alternate embodiments where an initial state is not captured for each virtual machine, the set of local changes is the set of differences between the current snapshot and a base snapshot of an exemplary virtual machine that was captured per process 500 of FIG. 5. In such alternate embodiments, the set of local changes stored in 814 would be the set of differences between the snapshots of each virtual machine being suspended and the base snapshot. Likewise, the current snapshots of each virtual machine in such alternate embodiments may be restored in 908 of FIG. 9 by combining the set of local changes to the base snapshot of the exemplary virtual machine.

In some embodiments, the virtual machine is terminated and de-provisioned at this point. Note that the embodiment of 800 may be combined with other embodiments such as 600. For example the operations of 810-14 may be included as part of the normal operation of 610; that is, the virtual machine may run, the system performing the process may determine whether a suspend instruction has been received in 812 and, if so, perform the operations of 814. Otherwise the system performing the process may determine whether it is time to terminate the virtual machine according the operations of 612, and if so perform the operations of 614. Otherwise, continue to run the virtual machine. Note too that one or more of the operations performed in 802-14 may be performed in various orders and combinations, including in parallel.

Figure 9:
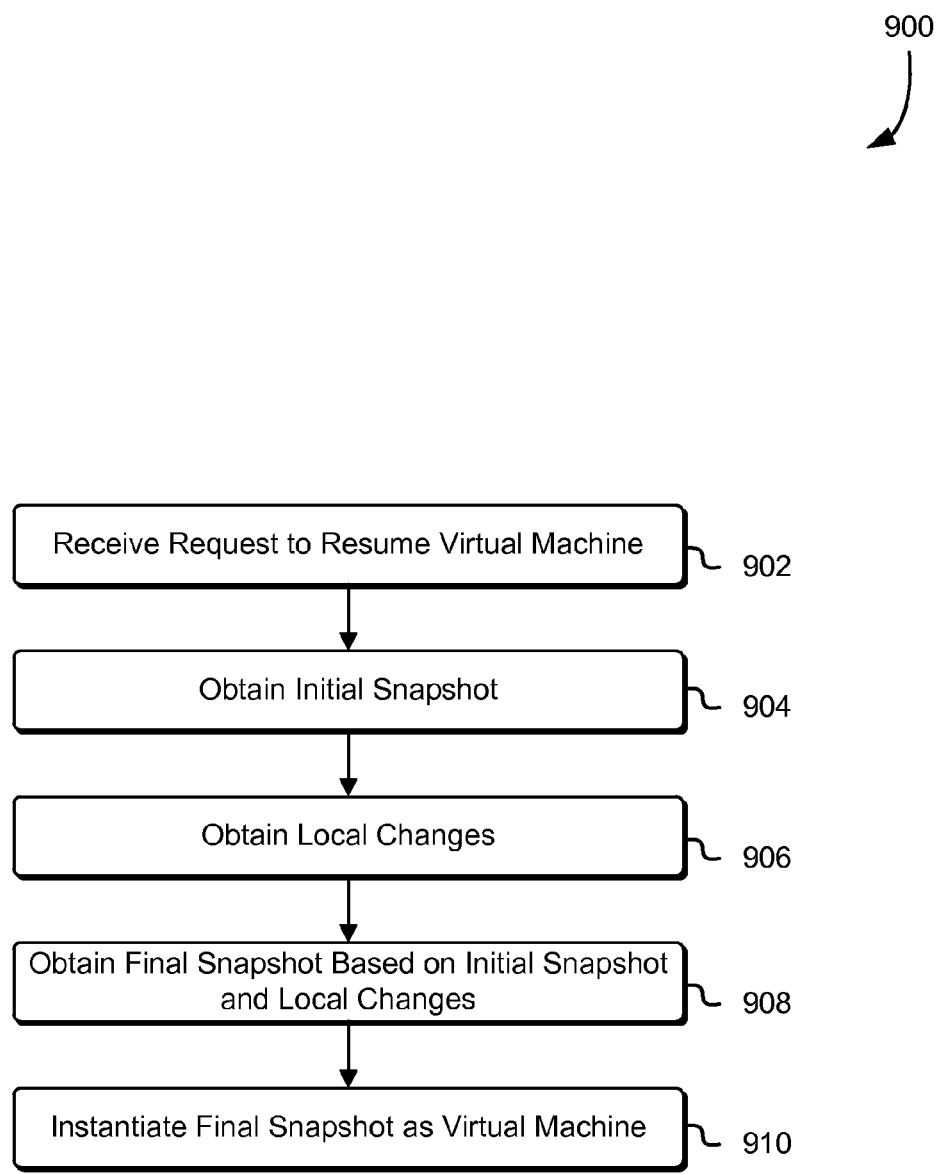
FIG. 9 is a block diagram that illustrates an example of resuming a virtual machine from suspend in accordance with an embodiment.

FIG. 9 is a flowchart that illustrates a process 900 for resuming a virtual machine from the suspension of process 800 according to an embodiment. The process 900 may be performed by any suitable system such as a server in a data center, such as the web server 1006 or the application server 1008 of FIG. 10, multiple computing devices in a distributed system of a computing resource service provider, or any electronic client device such as the electronic client device 1002 described in conjunction with FIG. 10. The process 900 includes a series of operations wherein a request to resume the virtual machine is received, an initial snapshot for the virtual machine is obtained (e.g., by combining a base snapshot of an exemplary virtual machine with the set of differences from an initial snapshot and the base snapshot), the set of local changes that were stored in 814 are obtained, a final snapshot is reconstructed based on the set of local changes and the initial snapshot, and the virtual machine is resumed by re-instantiating the virtual machine from the final snapshot.

In 902, a request to resume the virtual machine from suspension is received. In some embodiments, the request is received through an application programming interface provided to a customer owner of the virtual machine by a computing resource service provider. In some implementations, the request can come from the computing resource service provider or one of the services provided by the computing resource service provider, or other authorized entity such as an application authorized by the customer owner to resume the virtual machine. In other implementations, the request can come from a scaling service as described in the present disclosure.

In 904, the initial snapshot associated with the virtual machine being resumed from suspension is obtained. Note that in some embodiments, the initial snapshot may have been stored in persistent storage, such as the data store, and can be obtained in whole from the persistent storage. However, in some embodiments, only the set of differences between the initial snapshot and a base snapshot will have been stored, and in such embodiments, the initial snapshot can be obtained by re-creating the initial snapshot by combining a base snapshot of an exemplary virtual machine as described in the present disclosure with the set of differences.

Similarly, in 906, the set of local changes between the initial snapshot and the final snapshot (i.e., the snapshot taken of the virtual machine at the time of the suspension) may also be obtained from persistent storage. Then, in 908, the final snapshot may be reconstructed by combining the re-created initial snapshot with the set of local changes. As noted, in some implementations of the present disclosure, an initial snapshot specific to particular machine is not captured, in which the case the operations of 904 may be omitted and the operations of 908 may change to obtain the final snapshot by combining the set of local changes with the base snapshot of the exemplary virtual machine.

Once the final snapshot is reconstructed, in 910, the virtual machine can be re-instantiated and restored to the state it was at the time of the suspension using the final snapshot. Note that the process 900 may be performed in parallel for a plurality (e.g., a large fleet) of virtual machines of the customer owner that have been suspended in the manner of process 800 of FIG. 8. For example, upon receiving an instruction to suspend a large fleet (e.g., 10,000) of virtual machines, the system performing the process 800 may obtain a list of the virtual machines in the fleet, and send a request to software agents executing in hypervisors or controlling domains that cause the software agents to capture snapshots and/or sets of local changes for each of the virtual machines running under the hypervisor. Upon completion of the snapshot and storage of the snapshot and/or set of local changes to persistent storage, the software agent may cause each virtual machine to be terminated. Once the virtual machine has been terminate, the software agent may then notify the system performing the process 800 that the preservation process has been completed. The system may track (e.g., in a database table) the status of each virtual machine (e.g., "suspended"), the storage location of the snapshot and/or local changes, and storage locations of any base software image or initial snapshot for the virtual machine.

Upon receiving an instruction to resume the fleet of virtual machines, the system performing the process 900 may spawn a thread for performing the process 900 for each of the suspended virtual machines in the list in parallel using the snapshots and/or local changes at the locations specified in the list for each virtual machine. In this manner, the large fleet can be quickly restored from suspension while minimizing resource usage by using a base image common to all virtual machines in the fleet and stored local changes and/or differences from the base image specific to each suspended virtual machine. The system performing the process 900 may keep track of any virtual machines that fail to properly restore from suspension or whose snapshots are unable to be recreated from the files at the specified locations and repeat the process 900 for those virtual machines and/or report the errors to an administrator of the virtual computer system service or customer owner of the fleet. Note also that one or more of the operations performed in 902-10 may be performed in various orders and combinations, including in parallel.

The processes described in reference to FIGS. 8 and 9 may also be implemented in on-demand virtual machine environments. For example, some computing resource service providers provide on-demand virtual machine services where a customer may bid on a price for using a set of virtual machine instances. If the market price for the set of virtual machine instances is at or lower than the bid price, the customer may be allowed to use the set of virtual machine instances at the bid price. However, if the market price for the set of virtual machine instances rises above the bid price, one or more of the set of virtual machines may be terminated and de-provisioned in favor of providing a set of virtual machines to a higher bidder. If the market price subsequently drops below the customer's bid, or if the customer subsequently makes a higher bid, a set of virtual machines may be re-instantiated for the customer. In such an environment, prior to terminating the one or more virtual machines, the process 800 of FIG. 8 may be performed for each of the one or more virtual machines to save the final states of the virtual machines prior to termination, and, upon a subsequent drop in market price or higher bid by the customer, the one or more virtual machines may be restored to their previous states according to the process 900 of FIG. 9.

Embodiments of the present disclosure may also be used for efficient migration of a set of virtual machines from one physical host to another physical host. For example, the operations of 910 to instantiate the final snapshot is the virtual machine may be performed on a different physical computing system from the computing system on which the virtual machine was running when the final snapshot was captured in 814 of FIG. 8. Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 10:
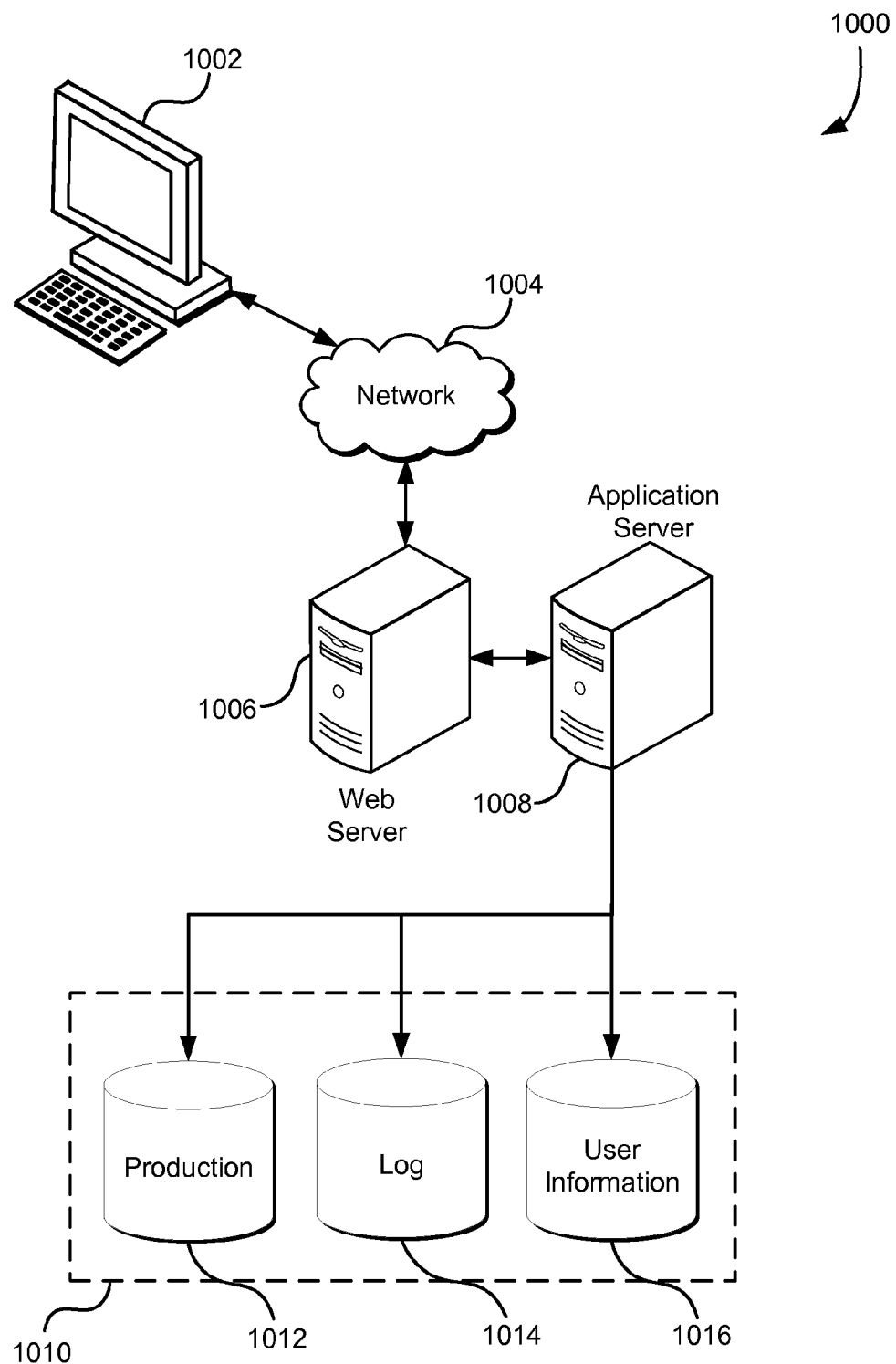
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network 1004 can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network 1004 can be enabled by wired or wireless connections and combinations thereof. In this example, the network 1004 includes the Internet, as the environment includes a web server 1006 for receiving requests and serving content in response thereto, although for other networks an alternative device serving a similar purpose could be used as would be apparent to one of ordinary skill in the art.

The illustrative environment includes an application server 1008 and a data store 1010. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server 1008 can include any appropriate hardware, software and firmware for integrating with the data store 1010 as needed to execute aspects of one or more applications for the electronic client device 1002, handling some or all of the data access and business logic for an application. The application server 1008 may provide access control services in cooperation with the data store 1010 and is able to generate content including, text, graphics, audio, video and/or other content usable to be provided to the user, which may be served to the user by the web server 1006 in the form of HyperText Markup Language ("HTML"), Extensible Markup Language ("XML"), JavaScript, Cascading Style Sheets ("CSS"), or another appropriate client-side structured language. Content transferred to a client device may be processed by the electronic client device 1002 to provide the content in one or more forms including, forms that are perceptible to the user audibly, visually and/or through other senses including touch, taste, and/or smell. The handling of all requests and responses, as well as the delivery of content between the electronic client device 1002 and the application server 1008, can be handled by the web server 1006 using PHP: Hypertext Preprocessor ("PHP"), Python, Ruby, Perl, Java, HTML, XML, or another appropriate server-side structured language in this example. It should be understood that the web server 1006 and application server 1008 are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store 1010 may include mechanisms for storing production data 1012 and user information 1016, which can be used to serve content for the production side. The data store 1010 also is shown to include a mechanism for storing log data 1014, which can be used for reporting, analysis or other purposes. It should be understood that there can be many other aspects that may need to be stored in the data store 1010, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the application server 1008. In one example, a user, through a device operated by the user, might submit a search request for a certain type of item. In this case, the data store 1010 might access the user information 1016 to verify the identity of the user and can access the catalog detail information to obtain information about items of that type. The information then can be returned to the user, such as in a results listing on a web page that the user is able to view via a browser on the electronic client device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the example environment 1000 in FIG. 10 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network 1004 can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 1004. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
    under the control of one or more computer systems configured with executable instructions,
        receiving a first request whose fulfillment involves suspending operations of a fleet of virtual machines of a customer of a computing resource service provider;
        as a result of receiving the first request, for each virtual machine of the fleet of virtual machines:
            preventing the virtual machine from receiving information from an external source that causes the virtual machine to perform work;
            obtaining a first set of local changes at least in part from persistent storage, the first set of local changes representing at least in part the differences between a base snapshot of an exemplary virtual machine image and a first snapshot of the virtual machine;
            capturing a second snapshot of the virtual machine;
            determining a second set of local changes based at least in part on differences between the second snapshot and the first snapshot;
            storing the first set of local changes and the second set of local changes; and
            terminating the virtual machine;
        receiving a second request whose fulfillment involves restoring former states of the fleet of virtual machines; and
        as a result of receiving the second request, for each virtual machine of the fleet of virtual machines:
            obtaining the first set of local changes, the second set of local changes, and the base snapshot from persistent storage;
            obtaining the first snapshot at least in part from the base snapshot and the first set of local changes;
            obtaining the second snapshot at least in part from the first snapshot and the second set of local changes; and
            instantiating the virtual machine to a former state based at least in part on the second snapshot.

2. The computer-implemented method of claim 1, wherein the fleet of virtual machines were instantiated from a common software image containing contents and structure of a storage volume.

3. The computer-implemented method of claim 1, wherein preventing the virtual machine from receiving work includes removing the virtual machine from a group of virtual machines being load-balanced.

4. The computer-implemented method of claim 1, wherein:
    the virtual machine is instantiated to the former state on a different physical computing system than a physical computing system the virtual machine was running on before the virtual machine was terminated.

5. The computer-implemented method of claim 4, wherein:
    the first request is received as a result of an increased demand for virtual machines of an on-demand virtual computer system service of a computing resource service provider; and
    the second request is received as a result of reduced demand for the virtual machines of the on-demand virtual computer system service.

6. The computer-implemented method of claim 1, wherein the virtual machine is instantiated to the former state on the same physical computing system the virtual machine was running on before the virtual machine was terminated.

7. A system, comprising:
    one or more processors; and
    memory including instructions that, when executed by the one or more processors, cause the system to:
        store a first set of local changes relative to a base snapshot and an initial snapshot;
        receive a first request whose fulfillment involves suspending operations of a first virtual machine provided by a computing resource service provider;
        as a result of receiving the first request:
            capture a second snapshot of a state of the first virtual machine;
            determine a second set of local changes based at least in part on differences between the second snapshot and a derived snapshot derived from the first set of local changes and the base snapshot;
            store the second set of local changes; and
            terminate the first virtual machine;
        receive a second request whose fulfillment involves instantiating a second virtual machine and configuring the second virtual machine to the state of the first virtual machine; and
        as a result of receiving the second request:
            derive a derived second snapshot based at least in part on the second set of local changes and the first set of local changes;
            instantiate the second virtual machine; and
            configure the second virtual machine to the state of the first virtual machine based at least in part on the derived second snapshot.

8. The system of claim 7, wherein the first and second virtual machines are members of a fleet of virtual machines having a common configuration but individual states.

9. The system of claim 7, wherein the first and second virtual machines are instantiated for use by an entity different from the computing resource service provider.

10. The system of claim 7, wherein a size of the set of local changes is less than twenty-five percent of a size of the base snapshot.

11. The system of claim 7, wherein:
    the virtual machine is a virtual machine of an on-demand virtual computer system service of a computing resource service provider; and
    the first request is associated at least in part on a reduction in demand for virtual computing resources from the on-demand virtual computer system service.

12. The system of claim 7, wherein the state of the first virtual machine corresponds to a state of operation of the first virtual machine at a time after the first request is received.

13. The system of claim 7, wherein the virtual machine is restored to a different physical computing system than a physical computing system the virtual machine was running on before the virtual machine was suspended.

14. The system of claim 7, wherein the virtual machine was instantiated from a base software image from which at least one other virtual machine is derived.

15. The system of claim 7, wherein the snapshot is a snapshot of one or more of contents of local memory of the virtual machine or contents of block-level storage allocated to the virtual machine at a time after receiving a request to suspend the virtual machines.

16. The system of claim 7, wherein the virtual machine is restored to a physical computing system that is the same physical computing system the virtual machine was running on before the virtual machine was suspended.

17. A non-transitory computer-readable storage medium having stored thereon executable instructions that, when executed by one or more processors of a computer system, cause the computer system to at least:
   receive a first request to suspend a set of virtual machines associated with an account of a customer of a computing resource service provider; and
   for each virtual machine of the set of virtual machines:
      obtain a first snapshot of an exemplary virtual machine;
      obtain a second snapshot of the virtual machine of the set of virtual machines;
      determine a first set of changes based at least in part on the second snapshot and the first snapshot;
      store the first set of changes in persistent storage in association with the virtual machine of the set of virtual machines;
      obtain a third snapshot of the virtual machine of the set of virtual machines;
      determine a second set of changes based at least in part on the third snapshot and the second snapshot;
      store the second set of changes in persistent storage in association with the virtual machine of the set of virtual machines; and
      terminate the virtual machine of the set of virtual machines;
   receive a second request to restore the set of virtual machines; and
   in response to receiving the second request for each virtual machine of the set of virtual machines:
      obtain the first set of changes and the second set of changes;
      derive the third second snapshot based at least in part on the second set of changes relative to the second snapshot and the first set of changes relative to the first snapshot; and
      instantiate and configure the virtual machine based at least in part on the third snapshot.

18. The non-transitory computer-readable storage medium of claim 17, wherein:
   the set of virtual machines are virtual machines of an on-demand virtual computer system service of a computing resource service provider; and
   the request to suspend the set of virtual machines is associated at least in part on an increase in demand for virtual computing resources from the on-demand virtual computer system service.

19. The non-transitory computer-readable storage medium of claim 17, wherein the executable instructions that, prior to obtaining the second snapshot, cause the computer system to remove the virtual machine from a group of virtual machines being load-balanced.

20. The non-transitory computer-readable storage medium of claim 17, wherein the executable instructions that, prior to obtaining the second snapshot, cause the computer system to isolate the virtual machine from one or more networks.

21. The non-transitory computer-readable storage medium of claim 17, wherein at least a portion of memory of the virtual machine is immutable.

22. The non-transitory computer-readable storage medium of claim 17, wherein the set of virtual machines were instantiated from a common base image.

23. The non-transitory computer-readable storage medium of claim 17, wherein the virtual machine is restored to a physical computing system that is the same physical computing system the virtual machine was running on before the virtual machine was suspended.

* * * * *